United States Patent
Van Der Linde

(10) Patent No.: US 10,611,070 B2
(45) Date of Patent: Apr. 7, 2020

(54) METHOD AND APPARATUS FOR PRODUCING A TRIM COMPONENT HAVING A MOLDED RIM AT AN EDGE THEREOF

(71) Applicant: OLBRICH GmbH, Bocholt (DE)

(72) Inventor: Albert Van Der Linde, Bocholt (DE)

(73) Assignee: OLBRICH GMBH, Bocholt (DE)

( * ) Notice: Subject to any disclaimer, the term of this patent is extended or adjusted under 35 U.S.C. 154(b) by 590 days.

(21) Appl. No.: 15/397,333

(22) Filed: Jan. 3, 2017

(65) Prior Publication Data
US 2018/0186052 A1 Jul. 5, 2018

(51) Int. Cl.
*B29C 45/72* (2006.01)
*B29C 45/26* (2006.01)
(Continued)

(52) U.S. Cl.
CPC ........ *B29C 45/72* (2013.01); *B29C 45/14196* (2013.01); *B29C 45/26* (2013.01);
(Continued)

(58) Field of Classification Search
CPC ... B29C 45/72; B29C 45/26; B29C 45/14221; B29C 2045/14188; B29C 45/14196; B29C 2045/14204; B29C 2045/2693
See application file for complete search history.

(56) References Cited

U.S. PATENT DOCUMENTS

| | | |
|---|---|---|
| 4,986,948 A | 1/1991 | Komiya et al. |
| 5,223,201 A | 6/1993 | Masui et al. |

(Continued)

FOREIGN PATENT DOCUMENTS

| | | |
|---|---|---|
| DE | 43 13 951 | 11/1993 |
| DE | 199 14 092 | 10/1999 |

(Continued)

OTHER PUBLICATIONS

European Extended European Search Report for European Patent Application No. 17 15 7874, dated Aug. 17, 2017, 8 pages, Munich, Germany.

*Primary Examiner* — Xiao S Zhao
*Assistant Examiner* — Emmanuel S Luk
(74) *Attorney, Agent, or Firm* — W. F. Fasse

(57) ABSTRACT

A one-shot molding apparatus and method press-mold a trim component body between upper and lower molds, and injection-mold a plastic rim onto an edge of the trim component body using an additional edge molding tool, in a single molding apparatus in a single molding cycle. The edge molding tool may have a cutting edge that cooperates with a counter edge on the upper or lower mold to remove excess material and form a precise cut edge of the trim component body before forming the molded rim. The edge molding tool is movable relative to the upper and lower molds in a direction parallel or perpendicular or oblique relative to a motion direction of the upper and lower molds. Additional movable nested tools can be provided on the upper and/or lower mold to achieve greater adaptability of the injection-molding cavity. The rim can be molded onto the cut edge, and molded around the edge onto the back and/or front side of the trim component body. The trim component may be a trim panel for the interior of a motor vehicle.

23 Claims, 12 Drawing Sheets

(51) Int. Cl.
*B29C 45/14* (2006.01)
*B29L 31/30* (2006.01)

(52) U.S. Cl.
CPC ............... *B29C 45/14221* (2013.01); *B29C 2045/14188* (2013.01); *B29C 2045/14204* (2013.01); *B29C 2045/2693* (2013.01); *B29L 2031/30* (2013.01); *B29L 2031/3041* (2013.01)

(56) References Cited

U.S. PATENT DOCUMENTS

| | | | |
|---|---|---|---|
| 5,415,536 A | 5/1995 | Ohno | |
| 5,498,387 A * | 3/1996 | Carter | B29C 45/26 264/219 |
| 5,718,791 A | 2/1998 | Spengler | |
| 5,916,600 A * | 6/1999 | Dubay | B29C 33/0044 264/252 |
| 6,428,734 B1 * | 8/2002 | Vandevelde | B29C 45/0046 264/328.12 |
| 6,461,137 B1 * | 10/2002 | Ash | B29C 33/0044 264/252 |
| 6,524,506 B2 | 2/2003 | Spengler | |
| 6,849,225 B1 * | 2/2005 | Gilbert | B29C 45/14196 264/163 |
| 6,887,413 B1 | 5/2005 | Schumacher | |
| 8,215,947 B2 * | 7/2012 | Kato | B29C 45/2608 425/412 |
| 9,840,207 B2 * | 12/2017 | Blottiau | B29C 45/162 |
| 2006/0043631 A1 * | 3/2006 | Lang | B29C 45/14221 264/161 |
| 2007/0057401 A1 * | 3/2007 | Dooley | B29C 45/14221 264/161 |
| 2012/0128918 A1 * | 5/2012 | Fiammengo | B29C 45/1639 428/68 |
| 2013/0078403 A1 * | 3/2013 | Kano | B29C 45/14221 428/36.92 |
| 2013/0273191 A1 * | 10/2013 | Dooley | B29C 37/02 425/292 |
| 2015/0017368 A1 * | 1/2015 | Kondou | B29C 45/14434 428/38 |
| 2017/0066166 A1 * | 3/2017 | Park | B29C 43/18 |
| 2018/0264694 A1 * | 9/2018 | Yen | B22D 17/002 |
| 2019/0152100 A1 * | 5/2019 | Rubsam | B29C 45/1418 |

FOREIGN PATENT DOCUMENTS

| | | |
|---|---|---|
| DE | 202013005670 | 7/2013 |
| DE | 102014217173 | 3/2016 |
| EP | 0 272 635 | 6/1988 |
| EP | 0 433 857 | 6/1991 |
| EP | 0 747 201 | 12/1996 |
| EP | 2 457 706 | 5/2012 |
| JP | 62-135332 A | 6/1987 |
| JP | 06-114879 A | 4/1994 |
| JP | 08-156023 A | 6/1996 |
| JP | 2009-113548 A | 5/2009 |
| JP | 2010-274636 A | 12/2010 |
| JP | 2014-058196 A | 4/2014 |
| WO | WO 96/009155 | 3/1996 |

\* cited by examiner

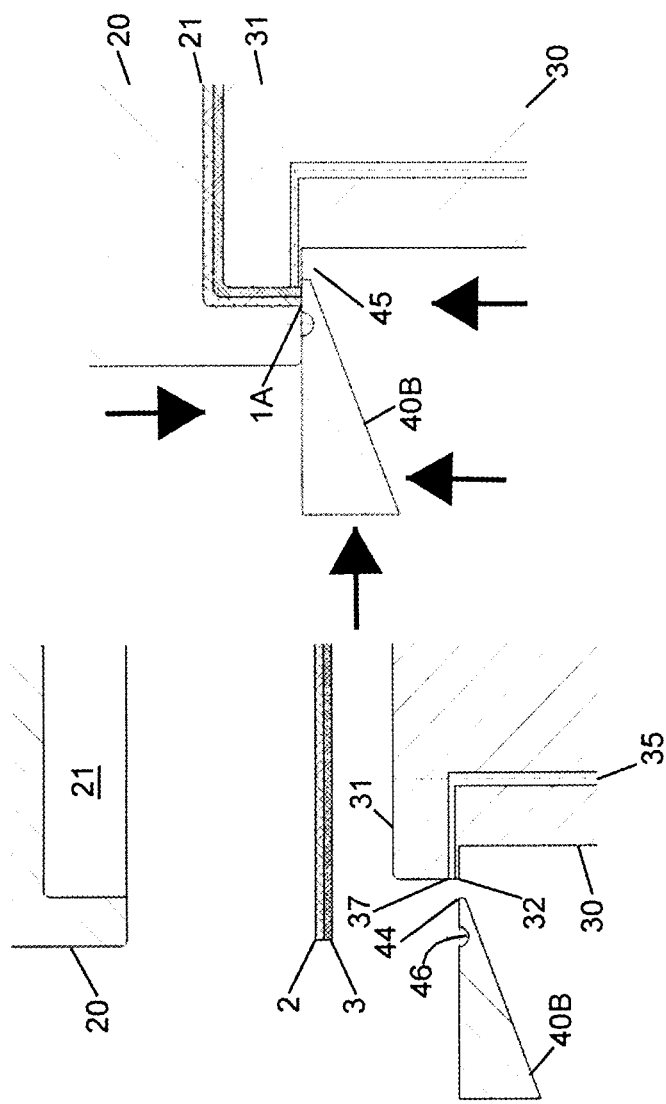
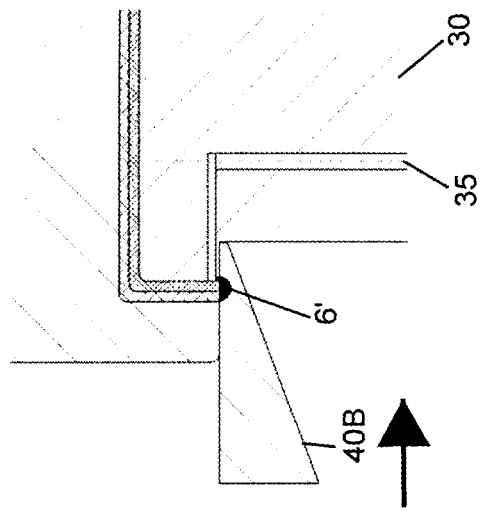
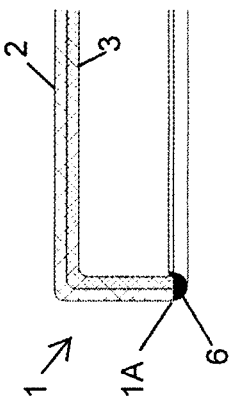
FIG. 6A
FIG. 6B
FIG. 6C
FIG. 6D

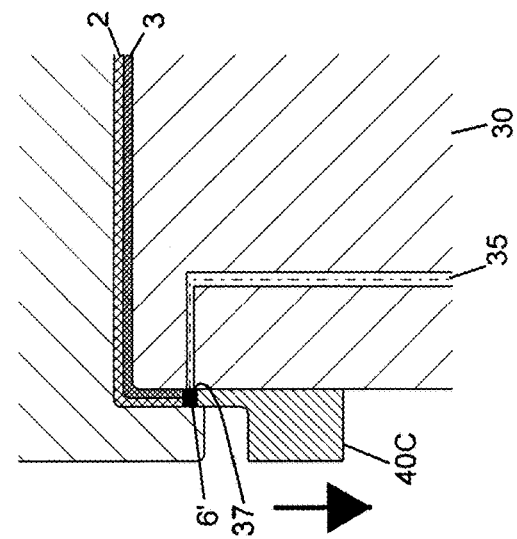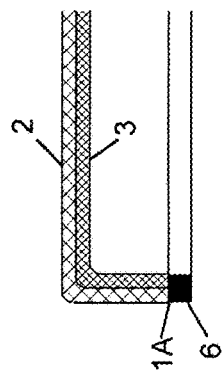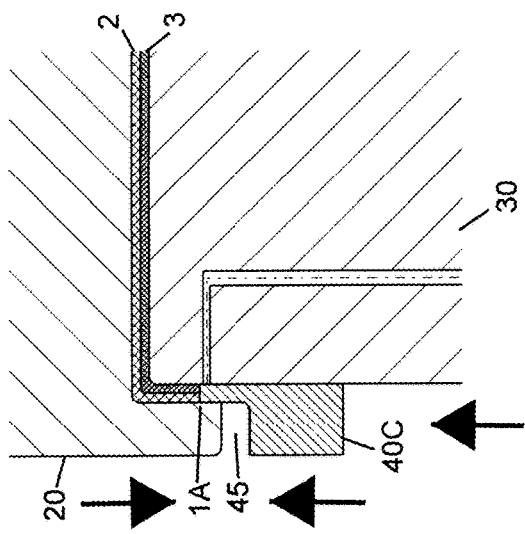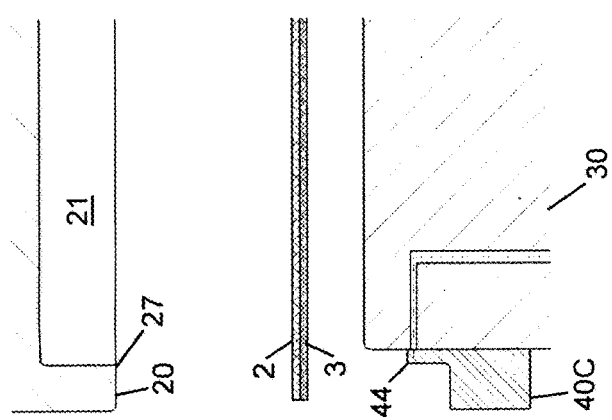

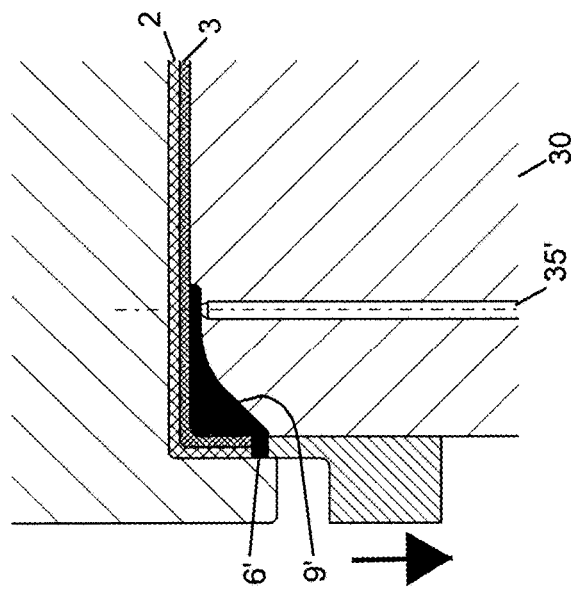
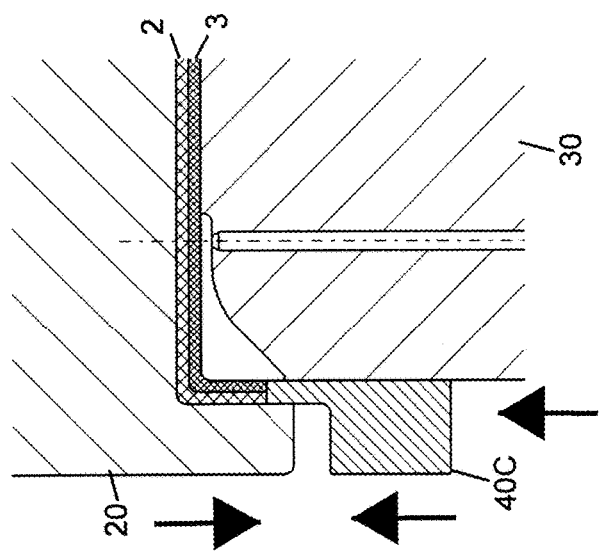
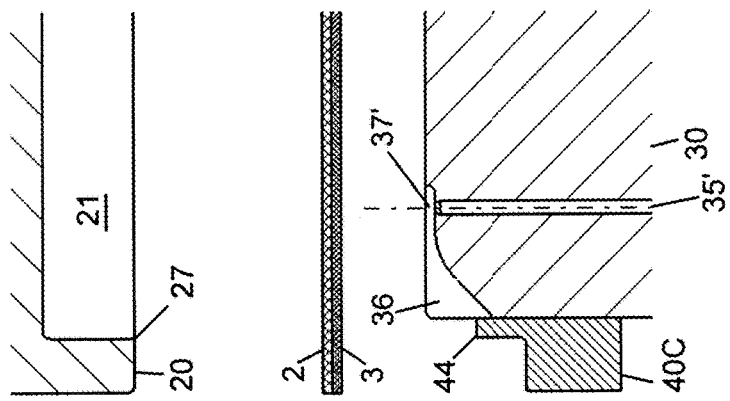
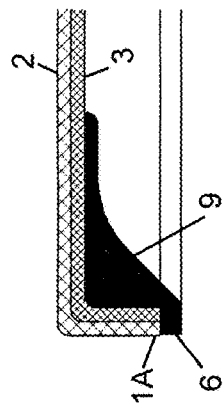
FIG. 9A
FIG. 9B
FIG. 9C
FIG. 9D

METHOD AND APPARATUS FOR PRODUCING A TRIM COMPONENT HAVING A MOLDED RIM AT AN EDGE THEREOF

FIELD OF THE INVENTION

The invention relates to a method and an apparatus for producing a trim component such as an automotive trim panel that includes an injection-molded rim on an edge of a press-molded trim component body.

BACKGROUND INFORMATION

Trim components such as trim panels are typically used for covering and finishing the interior passenger cabins of automobiles, aircraft, rail vehicles, etc., as well as luggage areas and some external areas of such vehicles. For example, in automotive applications such trim components include headliners, door liners, armrest pads, storage bins, consoles, dashboard covers, load floors, package trays, pillar covers, trunk liners, engine hood covers, wheel well liners, etc. Especially in the interior trim applications, such trim components are to provide a surface covering that is visually attractive and comfortable to the touch, as well as providing acoustic insulation and damping. In exterior trim applications, such trim components are to provide weather protection, heat shielding, acoustic damping and insulation, and/or other specialized functions. In some applications such as load floors, the trim components also must provide sufficient structural strength for supporting the intended load. For these reasons, trim components are fabricated from a great variety of different materials providing the required functional properties. Typically, a trim component such as a trim panel includes a cover layer (also known as a "decor" layer) laminated onto a substrate, whereby the cover layer provides an attractive appearance or weather protection or heat shielding, etc., and the substrate provides the structural strength and three-dimensional form of the component. One or more additional layers, such as foam padding and thermal or acoustic insulation layers, may be laminated between the cover layer and the substrate. In some applications, a separate cover layer is not required, and the trim component may consist of a single layer that provides both the required structural strength and the required surface characteristic. The substrate may be made of various materials, for example synthetic plastic such as ABS or propylene, fiber board stock including wood fibers or other natural fibers embedded in plastic resin, fiberglass panels, or a hybrid composite including natural fibers together with synthetic plastic fibers, such as a natural fiber and polypropylene fiber composite. The plastic materials of the substrate may include thermoplastic and/or thermoset materials. The cover layer may be made of decorative woven or non-woven fabric, fleece, natural leather, imitation leather, or vinyl or other plastic sheet materials, preferably bonded to a backing of a foam material, such as polyether or polyethylene foam.

Various methods are known for press-molding such trim components. Typically a sheet of the substrate material, a sheet of the cover layer material, and one or more sheets of any intermediate layers are stacked to form a sandwich structure, which is placed between a lower mold and an upper mold of a molding press. The upper and lower molds are closed relative to one another, and thereby the layered sandwich structure is laminated, compressed and three-dimensionally molded, under the effects of heat and pressure between the upper and lower molds. Generally in this regard, the cover layer and substrate materials are thermoformable, i.e. so that they may be heated to a softening or molding temperature, then molded into a desired three-dimensionally contoured shape, and then cooled to become rigid and maintain the contoured shape. However, due to tolerances and misalignments that arise during the laminating and molding process, and due to the stretching and molding deformation of the cover layer and the substrate during the molding process, the various layers are stretched and/or pulled back by differing extents. Therefore, typically the cover layer must be initially provided with oversized dimensions relative to the desired finished size of the resulting laminated trim component to allow for the variable shrinkage or pull-back of the edges of the cover layer (which is difficult to predict). If the amount of shrinkage or pull-back is not exactly correctly predicted and accommodated, then there will be either an excess or a shortage of the cover layer material along the edges of the trim component after the laminating and molding process. Therefore an extra edge-trimming process is often necessary. Even then, it is difficult to neatly cut the edge of the molded trim component to form a neat and clean edge thereof. Also, even if the edge can be neatly cut, it has a visually unattractive appearance and is subject to delaminating or unraveling if this edge is exposed in the final installed condition of the trim component.

To avoid the above problem of forming a neat and clean cut edge of the trim component, it is known to fold the edge of the cover layer around the substrate edge to form an edge-folded rim rather than a cut edge of the trim component. For example, U.S. Pat. No. 5,718,791 discloses a method and an apparatus of laminating a trim panel, and folding a cover sheet edge around the panel's rim in a one-shot process in a single apparatus that performs the molding and laminating of the component between an upper mold and a lower mold, and includes edge-folding tools laterally movably arranged around the perimeter of the upper mold arrangement. The edge-folding tools are effective to fold an excess flange of cover sheet material around the back side of the edge of the substrate in order to produce a neatly finished trim component with the cover sheet edge wrapped or folded around a rim of the substrate. However, even with such edge-folding, it is difficult to pre-determine the correct size of the cover layer necessary to accommodate the stretching and possible pull-back of the cover layer around the edges during the three-dimensional molding and laminating process. Thus, even after the edge-folding, there might be excessive or insufficient cover layer material around the trim component rim. Such a problem is addressed or avoided in U.S. Pat. No. 6,524,506, which discloses a combination tool for carrying out both edge-folding and cutting of the rim of a trim panel.

In some applications it is not desired or not ideal to use a trim component that has the cover layer folded around the edge thereof as described above. For example, the edge-folding of the cover layer requires additional cover layer material, which adds to the cost of the trim component especially when a high-value cover material such as natural leather is used. Namely, the leather cover material folded around the edge of the trim component requires extra leather even though it will not be visible in the final installed condition. Furthermore, when a trim component is installed with its edge abutting against another component, it is often desirable to form an improved seal and finished appearance of the trim component edge against the adjoining or abutting component. For example, it may be desired to provide a flexible and adaptable rim that can seal against the adjoining component within a certain tolerance range to allow for fabrication and installation tolerances or variations, while still achieving a tight-fitting seal, for example to prevent air, noise or dust infiltration, or to achieve a neat, tight-fitting finished appearance.

For these reasons, it has become known to provide an injection-molded rim such as a molded flange, bead or lip along the edge of a press-molded trim component. Conventionally, the trim component body is first press-molded between upper and lower molds of a first molding apparatus, generally as described above. Further steps of preparing the materials of the layer or layers, by heating, pre-compressing, calibrating, pre-laminating, etc. are also well known in the art, and will not be described in further detail here. It is further known that the substrate and/or the cover layer can each be either a single layer or a pre-laminated sandwich of several layers, or several layers can be introduced individually or as a pre-laminated component into the molding apparatus. As needed, the edge of the trim component body is also cut to the appropriate size and shape. The first press-molding apparatus is then opened, and the press-molded trim component body is removed from it and placed into a second injection-molding apparatus. This apparatus for example includes upper and lower injection-mold tools that form an injection-molding cavity around the perimeter of the trim component body. This injection-molding cavity adjoins and is seated and sealed onto the edge portion of the trim component body, plastic is injected into the mold cavity, and is then cooled or cured and thereby hardened to form a plastic frame or rim along the perimeter of the trim component body. The plastic frame or rim is adhered onto the edge portion of the trim component body by the molding process, because the injected plastic material contacts and adheres onto the edge portion of the trim component body under the injection and molding pressure, and then cures in place. During the injection-molding step, it is additionally possible to mold reinforcement ribs, retainers, domes, or other such plastic structures on the back mounting side of the trim component body, while the injection-molded rim is also being produced. Furthermore, the injection-molded rim or frame may be continuous around the entire perimeter of the trim component body, or it may be formed only in certain limited or bounded areas as needed. After the initial cure, the injection-molding tools are opened and the finished component including a plastic frame or rim along the edge of the trim component body is removed from the injection-molding apparatus.

The above conventional production process suffers the disadvantage that it requires two separate procedures carried out sequentially in two separate molding apparatuses, namely first a press-molding process carried out in a press-molding apparatus to form the trim component body, and then secondly an injection-molding process carried out in an injection-molding apparatus to form the plastic frame or rim along the edge of the trim component body. The extra equipment and extra process steps entail additional capital expenditure and additional labor and process costs. Furthermore, it has been found that the bonding or adhesion of the injection-molded plastic frame or rim onto the edge portion of the trim component body may be insufficient. This last problem has been addressed in German Utility Model DE 20 2013 005 670 U1, by providing an improved mechanical engagement between the injection-molded plastic frame or rim and the edge portion of the trim component body, by forming holes, notches or recesses along the edge of the trim component body. The injection-molded plastic engages and bonds into these holes, notches or recesses to achieve improved multi-dimensional adhesion and engagement of the injection-molded rim onto the trim component body.

To address the above disadvantage of conventionally requiring two separate processes in two separate molding apparatuses, German Patent Laying Open Publication DE 10 2014 217 173 A1 discloses a method and an apparatus for forming a molded trim component including an injection-molded rim on a laminated and molded trim panel body. A single apparatus is used to carry out a single process in which a trim panel body is three-dimensionally press-molded, cut to a perimeter shape, provided with an injection-molded rim, and provided with injection-molded or back-molded functional components such as reinforcement ribs on the back side of the panel body. To achieve this, the apparatus includes an upper mold and a lower mold, between which the trim panel body is press-molded. The upper mold and lower mold further include cooperating cutting edges that cut the perimeter edge of the trim panel body as the upper and lower molds close relative to each other. One cutting edge is fixedly provided on the upper mold tool, and the other counter-cutting edge is provided fixedly on the lower mold tool. After the perimeter edge of the trim panel body is cut, the press-molding further proceeds, whereby the cut edge of the trim panel body is pulled back slightly away from the perimeter of the mold cavity due to the pulling deformation of the trim panel body during the press-molding. The area where the cut edge of the trim panel, body has been pulled back away from the edge of the mold cavity forms an injection-molding cavity space into which an injection-molding material is injected through an injection channel or sprue provided in the lower mold. This forms an injection-molded rim bonded or adhered onto the cut edge of the trim panel body. The injection-molded rim forms a clean finished edge of the completed trim component. A reinforcement rib or the like can be simultaneously injection-molded onto the back side of the trim panel body, and adjoins the molded rim.

A problem or disadvantage of the above known method and apparatus is that the final width and shape of the injection-molded rim depends on the extent to which the cut edge of the trim panel body material retracts or pulls back during the final stage of the press-molding after the panel body edge has been cut by the two cooperating cutting edges as the upper and lower mold tools begin to close upon one another. Because of the variable and somewhat unpredictable and imprecise retraction or pull-back of the cut edge of the trim panel body, it is not possible to form a precisely dimensioned and uniform injection-molded rim. Instead, for example, the width of the finished injection-molded rim will depend on, and vary with, the particular local extent of the retraction or pull-back of the cut edge of the trim panel body at each location around the perimeter of the trim panel body. Because different areas will have different amounts of retraction due to different three-dimensional press-molding contours, the width of the finished injection-molded rim will also vary. Furthermore, by mounting the cutting tools fixedly on the upper and lower mold tools respectively, and by forming the injection-molding cavity with the same upper and lower mold tools used for the press-molding, the known apparatus and method provide only limited adaptability for achieving different configurations of the injection-molded rim and the trim component. It is desired to overcome these disadvantages.

SUMMARY OF THE INVENTION

In view of the above, it is an object of at least certain embodiments of the present invention to provide an apparatus and a method for forming a trim component that includes an injection-molded rim on an edge portion of a press-molded trim component body. More particularly, it is an object of at least certain embodiments of the invention to provide a single "one-shot" molding apparatus in a single work station, which forms such a trim component in a "one-shot" method with a single sequence of process steps that are preferably performed in an automated manner and automated sequence without requiring manual handling of the trim component, the trim component body, or the injection-molded rim between or during any of the process steps involved in press-molding the trim component body and injection-molding the molded rim on the edge portion of the trim component body. A further object of at least certain embodiments of the invention is to injection-mold the molded rim onto or even around one, two or three sides of the edge portion of the trim component body. Another particular object of at least certain embodiments of the invention is to achieve a uniform, consistent edge configuration and dimensioning of the injection-molded rim and of the edge portion of the trim component body, by cutting off excess material to form a cut edge of the trim component body at a precisely defined location, which is not changed or shifted due to stretching, pulling or deformation of the material of the trim component body during the press-molding of the trim component body. Another particular object of at least certain embodiments of the invention is that the edge portion of the trim component body shall not be compressed during the injection-molding, so that the injected plastic material can better penetrate and bond into the pores or openings of the material of the edge portion of the trim component body during the injection-molding. Still a further object of at least certain embodiments of the invention is to simultaneously injection-mold additional plastic parts such as reinforcement ribs, retainers, mounting structures, hole reinforcement rings, domes, and the like onto a back side of the trim component body during the same single one-shot molding process performed in the same single one-shot molding apparatus. The invention further aims to avoid or overcome the disadvantages of the prior art, and to achieve additional advantages, as apparent from the present specification. The attainment of these objects is, however, not a required limitation of the claimed invention.

The above objects can be achieved in a molding apparatus according to the invention, for forming a trim component that includes an injection-molded rim on an edge portion of a press-molded trim component body. According to an embodiment of the invention, the molding apparatus includes a first mold tool e.g. an upper mold, a second mold tool e.g. a lower mold, and a third mold tool e.g. an edge molding tool. The first mold tool has a first press-molding surface such as a press-molding cavity. The second mold tool has a second press-molding surface such as a press-molding core that is configured and arranged to mate or cooperate with the first press-molding surface. The third mold tool has a third injection-molding surface and a cutting edge that cooperates with a counter edge provided on the first mold tool or the second mold tool. The first and second mold tools are movable relative to one another in a first direction to bring these tools into a closed position in which the first and second press-molding surfaces therebetween form a press-molding cavity adapted to press-mold the trim component body therein. The third mold tool is movable relative to the first and second mold tools in a second direction that may be parallel, perpendicular or oblique relative to the first direction. Thereby, the cutting edge of the third mold tool cooperates with the counter edge of the first or second mold tool to cut off an excess material of the trim component body and form a cut edge terminating the edge portion of the trim component body. Also thereby, the third mold tool is brought into a closed position relative to the first and/or second mold tool, wherein the third injection-molding surface bounds at least a portion of an injection-molding cavity in which at least an exposed part of the edge portion of the trim component body is received and exposed. At least one of the mold tools has therein at least one injection channel that communicates into the injection-molding cavity. An injection-moldable material can be injected through the injection channel into the injection-molding cavity so as to form the injection-molded rim onto and/or around the exposed part of the edge portion of the trim component body. The three mold tools preferably have abutment surfaces, such that two abutment surfaces of the third mold tool respectively abut against an abutment surface of the first mold tool and an abutment surface of the second mold tool, so as to enclose the injection-molding cavity sufficiently tightly to enable proper injection-molding therein.

The above objects can further be achieved in a method according to the invention, for forming a trim component that includes an injection-molded rim on an edge portion of a press-molded trim component body. The method according to an embodiment of the invention proceeds as follows. A sheet material is provided between a first mold tool and a second mold tool. The first and second mold tools are closed relative to one another, thereby press-molding the sheet material in a press-molding cavity defined between the first and second mold tools, to form the press-molded trim component body. A third mold tool is moved relative to the first mold tool and/or the second mold tool, thereby cutting an edge part of the sheet material between a cutting edge of the third mold tool and a counter edge of the first or second mold tool, to form a cut edge of the trim component body. The third mold tool is closed relative to the first and second mold tools to form an injection-molding cavity in which the edge portion of the trim component body is received. An injectable plastic is injected into the injection-molding cavity to contact an exposed part of the edge portion in the injection-molding cavity. The injectable plastic is cooled, cured and/or hardened to form the injection-molded rim on the edge portion of the trim component body. Finally, the mold tools are opened and the trim component is released and can be removed.

BRIEF DESCRIPTION OF THE DRAWINGS

In order that the invention may be clearly understood, it will now be described in connection with example embodiments thereof, with reference to the accompanying drawings, wherein:

FIGS. 6A to 6D are schematic sectional illustrations of a portion of a molding apparatus according to a fourth embodiment of the invention for forming a molded rim at an edge of a trim component, respectively showing successive stages of a fourth embodiment of a molding method carried out with the molding apparatus;

FIGS. 8A to 8D are schematic sectional illustrations of a portion of a molding apparatus according to a fifth embodiment of the invention for forming a molded rim at an edge of a trim component, respectively showing successive stages of a fifth embodiment of a molding method carried out with the molding apparatus;

FIGS. 9A to 9D are schematic sectional illustrations similar to FIGS. 8A to 8D, but showing an additional feature or variant of the fifth embodiment; and

FIG. 10 is a view of a back side of a finished trim component having an injection-molded rim at an edge thereof, and other structures injection-molded directly onto the back side thereof according to the invention.

DETAILED DESCRIPTION OF PREFERRED EXAMPLE EMBODIMENTS AND THE BEST MODE OF THE INVENTION

The present invention provides several embodiments of molding apparatuses and methods for forming a molded rim at an edge of a trim component, to provide a neat, clean finished edge that has an attractive appearance, a durable finishing of the edge that is resistant to unraveling and delaminating, an adaptable flexible seal against an adjoining component, a structural reinforcement of the edge area and/or other features. Such trim components are typically used for finishing the interior of the passenger compartment as well as the cargo area, trunk, and some exterior areas of motor vehicles, as well as in aircraft, trains, etc.

Figure 1A:
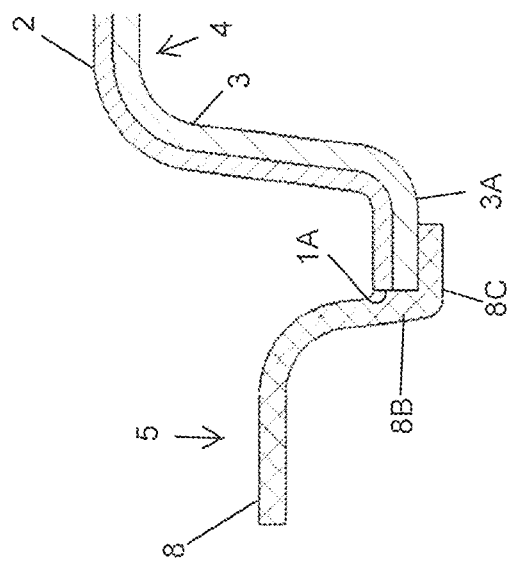
FIGS. 1A to 1C
are schematic sectional illustrations of the edge area of a trim component such as a trim panel, respectively showing different example configurations of a molded rim provided according to the invention on the edge of the trim component body.
Figure 1B:
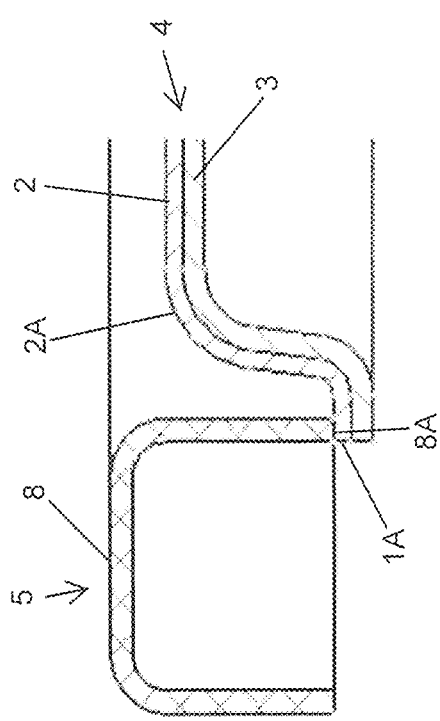
Figure 1C:
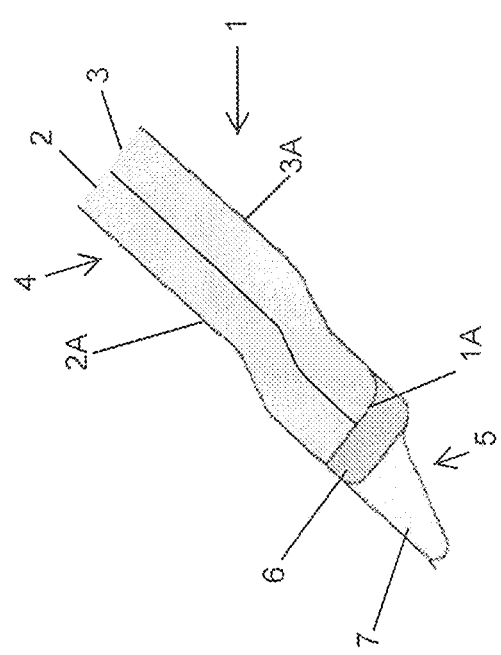

FIGS. 1A, 1B and 1C show examples of such a finished trim component 1 having a molded rim 5 provided on a trim component body 4 for finishing an interior area of a passenger compartment of a motor vehicle. The body 4 of such a trim panel 1 typically includes a cover layer 2 on a substrate 3. The cover layer 2 in this example is a decorative surface layer commonly known as a decor layer, which provides the visible front surface 2A with the desired appearance and other required surface characteristics in the final installed condition of the trim panel 1. The cover layer 2 is molded and laminated onto the substrate 3, which provides the structural strength and maintains the three-dimensional molded shape of the finished trim panel. The substrate 3 also forms the back mounting surface 3A of the trim component body 4, by which the finished trim component 1 may be mounted onto suitable mounting fixtures or other components on the interior of the vehicle in this example.

The cover layer 2 may, for example, be a layer of natural leather, synthetic leather, vinyl or other plastic sheet, woven fabric, non-woven fabric, fleece, etc. The substrate 3 may be a moldable composite layer of natural fibers, plastic fibers, glass fibers, and/or carbon fibers, etc. embedded in a plastic matrix, a combination of thermoset and thermoplastic fibers, or natural and thermoplastic fibers, etc., as a preferred example comprising natural fibers embedded in a matrix of melted, thermoformed and thermobonded polypropylene fibers. Additional layers such as foam padding, thermal insulation, acoustic insulation, etc. can be incorporated between the cover layer 2 and the substrate 3. Alternatively, the trim panel may have only a single composite layer that provides all the necessary characteristics. The molded rim 5 may be formed of polypropylene (PP), acrylonitrile butadiene styrene (ABS), nylon (such as polyamide 6 nylon PA6), respectively with or without reinforcement fibers, or an elastomer or rubber, etc. The construction and materials of the trim panel body and the molded rim are not limited by the present invention, and can have essentially any known structure, configuration and material composition of such trim components. The trim component also is not limited to a trim panel, but can have other trim component configurations. A common feature of the trim components in the context of several embodiments of the present invention, is that the trim component body is pressed and molded between two mold tools and the molded rim is injection-molded onto an edge portion of the trim component body, as will be described below.

FIG. 1A shows a first example of a molded rim 5, particularly in the form of a molded edge bead 6 that is molded onto a cut edge 1A of the trim component body 4. The edge bead 6 covers and encloses the cut edge 1A and thereby provides a neat finished appearance and resists delamination of the cover layer 2 from the substrate 3 at the edge, and resists unraveling of the respective layers at the edge. This type of molded rim 5, i.e. edge bead 6, however, does not extend significantly onto the visible front surface 2A or the back mounting surface 3A of the trim component 1. The edge bead 6 may be formed of a relatively hard thermoplastic or thermosetting plastic, or a softer plastic, elastomer or rubber. The material is selected to provide the required features of the finished molded rim 5.

FIG. 1A further shows an edge flange 7 as an alternative or additional type or configuration of the molded rim 5. Namely, the edge flange 7 can be provided in addition to or instead of the edge bead 6, or for example the edge bead 6 can be provided continuously along the entire edge perimeter of the trim component body 4, while the edge flange 7 is provided only at particular locations along the perimeter requiring the features of such an edge flange 7. A characteristic feature of the edge flange 7 is that it protrudes away from the cut edge 1A of the trim component so that its cross-section is elongated in the direction extending away from the cut edge 1A. The edge flange 7 preferably consists of a soft flexible plastic, elastomer or rubber, so that it forms a flexible flange or lip to provide a flexible, adaptable seal of the finished trim component 1 against an adjacent component.

FIG. 1B shows a further example of a molded rim 5 in the form of an edge reinforcement frame 8, of which an edge 8A is molded and adhered onto the front surface 2A of the cover layer 2 of the trim component body 4. The edge frame 8 in this example is not molded and adhered onto the cut edge 1A of the trim component body 4, nor onto the back surface 3A of the substrate 3. The edge frame 8 preferably consists of a relatively hard plastic to form a structurally strong and stiff frame around the perimeter (or a portion thereof) of the trim component, for stiffening, strengthening and mounting the trim component in its final installed condition. The molded edge frame 8 or generally the molded rim 5 may alternatively be configured as a functional part that will be visible and accessible on the visible side of the trim component, for example such as a storage bin, console compartment, door bin, armrest hand grip recess, or the like. The edge frame 8 covers the cut edge 1A from view so that the cut edge is not visible from the visible front side 2A, but the frame does not encapsulate and prevent delamination or unraveling of the layers 2 and 3 of the trim component body 4.

FIG. 1C shows a further example of an edge frame 8 (or edge flange) which includes an edge rim 8B that is molded and adhered onto the cut edge 1A of the trim component body 4, as well as a back rim 8C that is molded and adhered onto the back surface 3A of the substrate 3. Thereby this embodiment or configuration of the edge frame 8 is not only molded onto the cut edge 1A, but rather is molded around, and covers and encapsulates at least two sides 1A and 3A of the cut edge 1A to help resist delamination, unraveling and/or fraying thereof. Also, because the back rim 8C reaches around the back side of the trim component body 4, it achieves a larger area of molded adhesion between the edge frame 8 and the trim component body 4. Namely, by molding the molded rim or particularly the edge frame 8 at least partially around the edge of the trim component body 4, the adhesion and mounting strength of the molded rim on the trim component body is significantly improved compared to configurations or embodiments in which a molded rim is molded and adhered only onto a single side or surface or edge of the trim component body. In a further embodiment, the edge frame 8 is molded completely around the cut edge 1A to include a back rim 8C molded and adhered onto the back surface 3A as well as a front rim 8D molded and adhered onto the front surface 2A (see FIG. 4B). With the molded rim 5 molded entirely around the edge of the trim component body in such a manner, the edge of the trim component body is completely encased and clasped within the molded rim, which provides the greatest protection and reinforcement of the edge of the trim component body, as well as the best adhesion of the molded rim onto the trim component body.

Figure 10:
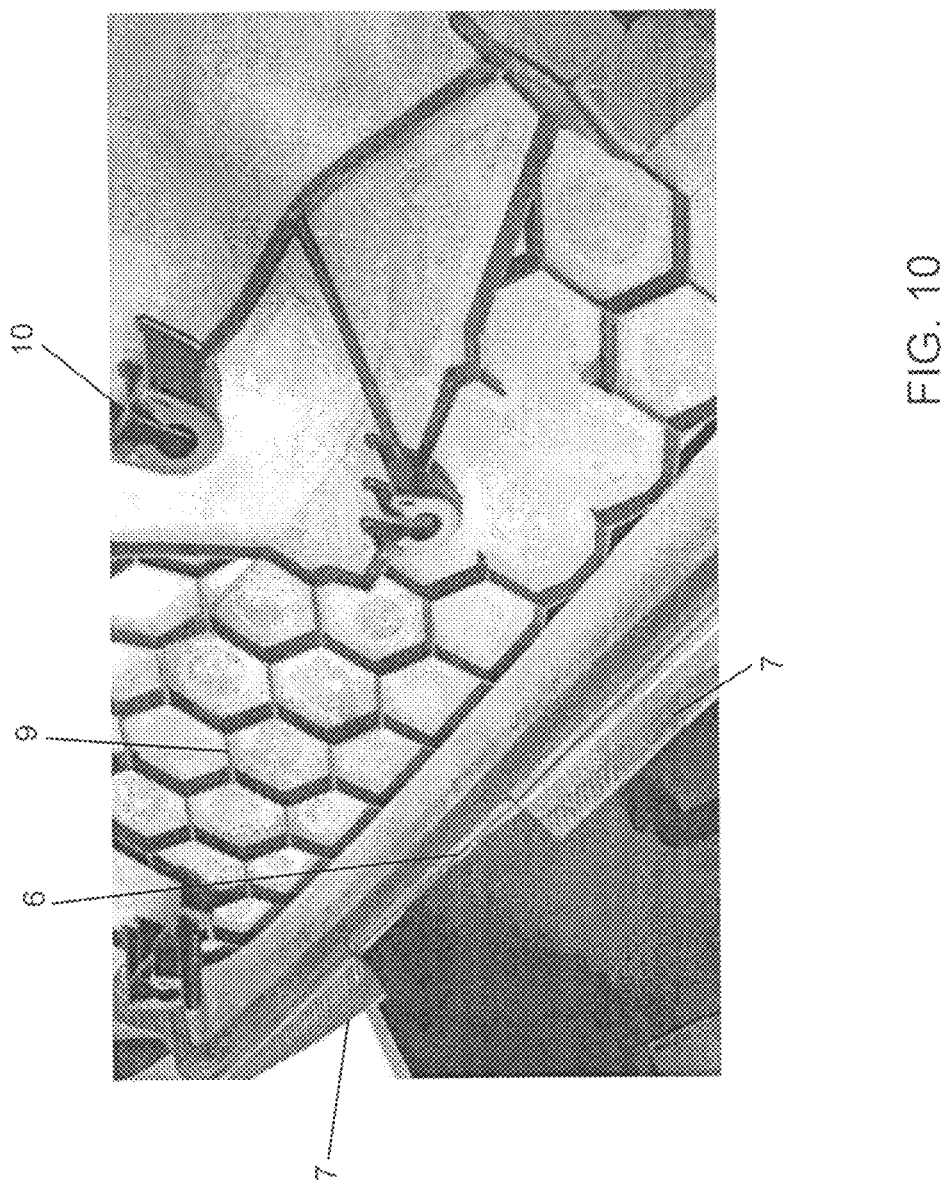

In addition to the molded rim 5 provided on or at an outer perimeter edge of the trim component body 4, the methods and apparatuses according to the invention can simultaneously also provide injection-molded reinforcement ribs 9, retainers 10 or other mounting structures, domes, reinforcement rings around interior holes through the trim component, etc. on the back mounting surface 3A of the trim component 1, for example as shown in FIG. 10. There, a combination of a continuous edge bead 6 and a discontinuous edge flange 7 as the molded rim 5 can also be seen. All of these injection-molded plastic parts 6, 7, 9, 10 are formed in a one-shot molding process in a single molding apparatus station according to the invention, in any one of several embodiments as will be described next.

A significant feature of at least one embodiment of the invention is that trim components as described above, including a press-molded trim component body 4 and an injection-molded plastic molded rim 5, are produced in a single molding apparatus, in a single molding station, in a so-called one-shot molding process that involves a sequence of steps performed (preferably automatically) in the same single molding station without needing to remove, replace or reposition the trim component body or the molded rim during the process or between the steps of the process. The finished trim component 1 is removed from the apparatus at the completion of the process, without any intermediate handling during the process, and without the need of subsequent finishing steps such as edge-trimming or the like.

FIGS. 2A to 2E illustrate a first example embodiment of such a molding apparatus and molding method according to the invention. The drawings merely schematically show a small portion of the overall or complete molding apparatus, in the area of the edge of the trim component to be produced. This limited schematic illustration of a small portion of the apparatus is sufficient to enable a person of ordinary skill in the art to practice the invention, because the other non-illustrated portions of the apparatus are conventionally known or understood. For example, a person of ordinary skill will readily understand that the apparatus includes additional components and devices that are not, and do not need to be, illustrated; such as heating devices, cooling devices, material carrying frames, material transport conveyers, actuators, controls, machine frames or supports, ejector pins, etc. Such additional devices and components can be embodied, configured and arranged in any conventionally known or understood manner. For example, while various motion sequences of several components of the molding apparatus will be discussed below, a person of ordinary skill will readily understand that the molding apparatus additionally comprises actuators and controllers configured and arranged to move the mold components in the described manner, even though these additional auxiliary devices (e.g. actuators and controllers) are not illustrated or described. As an example, the actuators for moving the mold components in the described manner may comprise hydraulic piston-cylinder devices, pneumatic piston-cylinder devices, motor-driven acme screw shafts, inflatable hose drives, cam drives, scissors drives, and/or any other known drive arrangements.

Figure 2C:
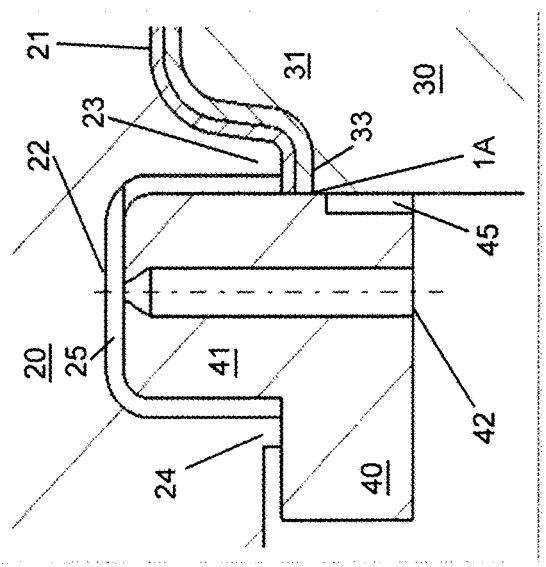
FIGS. 2A to 2E
are schematic sectional illustrations of a portion of a molding apparatus according to a first embodiment of the invention for forming a molded rim at an edge of a trim component, respectively showing successive stages of a first embodiment of a molding method carried out with the molding apparatus.
Figure 2B:
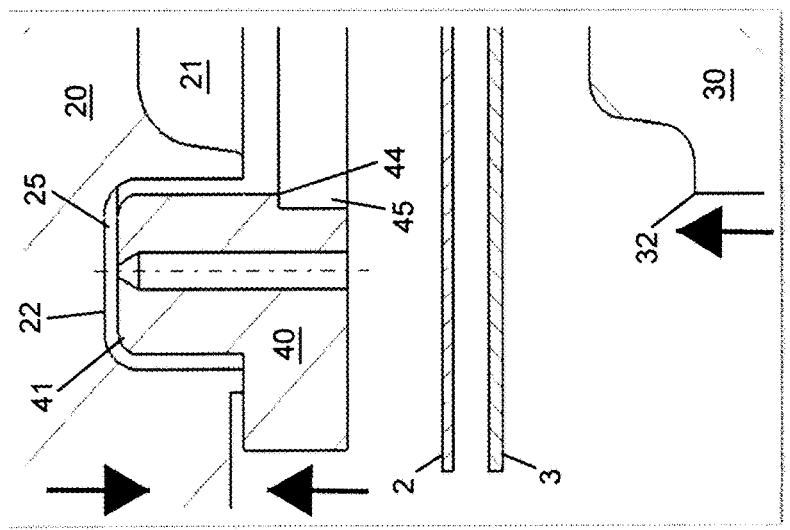
Figure 2A:
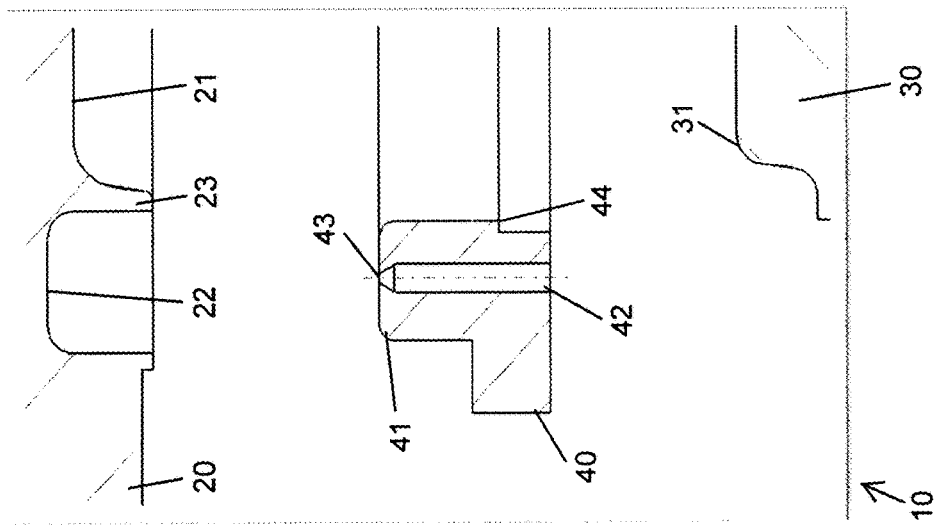

The one-shot molding apparatus 10 shown in FIG. 2A includes an upper mold 20 generally referred to as a first mold tool, and a lower mold 30 generally referred to as a second mold tool. The upper mold 20 defines a recessed press-molding cavity 21, and the lower mold 30 includes a protruding press-molding core 31 that suitably fits into the press-molding cavity 21 with an appropriately dimensioned gap to form a press-molding space therebetween in which the cover layer 2 and substrate 3 of the trim component body 4 will be laminated, pressed and three-dimensionally molded into the finished configuration. The upper mold 20 further defines an injection-molding cavity 22 adjacent to a perimeter of the press-molding cavity 21, with a mold cavity wall 23 between the two mold cavities 21 and 22. The molding apparatus 10 further includes an edge molding tool 40 generally referred to as a third mold tool.

In the present embodiment, the upper mold 20 and the lower mold 30 are movable vertically relative to one another, toward and away from one another. For example, the lower mold 30 may be stationary (with respect to the machine frame or foundation), while the upper mold 20 is movable up and down relative to the lower mold 30, or the upper mold 20 may be stationary while the lower mold 30 is movable up and down, or both the lower mold 30 and the upper mold 20 are movable up and down. All of these variants are covered by a general reference to the upper and lower molds being "movable relative to one another". Also, in the present embodiment, while the molds 20 and 30 are movable vertically up and down, these molds may instead move horizontally to the right and the left, in an arrangement in which basically the FIGS. 2A to 2E would each be rotated by 90° counterclockwise or clockwise. The illustrated arrangement is, however, the typical and preferred arrangement. The edge molding tool 40 is movable vertically up and down relative to, and thus parallel to the motion of, the upper mold 20 and the lower mold 30.

As shown in FIG. 2A, the edge molding tool 40 includes an injection-molding core 41 configured and arranged in alignment or registration with the injection-molding cavity 22 of the upper mold 20. The edge molding tool 40 is generally arranged vertically between the upper mold 20 and the lower mold 30, and is located at or around the perimeter of the lower mold 30. The configuration seen in FIGS. 2A to 2E can be continued or repeated continuously around the entire perimeter of the press-molding cavity 21, or is provided only at particular areas of the edge of the trim component that are required to have the molded rim 5 provided thereon. The edge molding tool 40 cooperates with the injection-molding cavity 22 of the upper mold 20 to define therebetween an injection-molding cavity space 25 in which the molded rim 5 of the trim component 1 will be formed. In this regard, the edge molding tool 40 further includes an injection-molding channel or sprue 42 extending through the edge molding tool 40 and particularly the injection-molding core 41 thereof, and terminating at an injection-molding nozzle or gate 43 at a surface of the injection-molding core 41. Molten thermoplastic material or viscous liquid thermosettable plastic material will be injected through the channel 42 and nozzle 43 into the injection-molding cavity space 25, as will be described below, to form the injection-molded rim 5. Still further, the edge molding tool 40 includes a cutting edge 44 that will cooperate with a counter edge 32 of the lower mold 30 for cutting off excess material of the trim component body.

A first embodiment of the one-shot molding process or method using the first embodiment of the one-shot molding apparatus 10 proceeds as follows. As shown in FIG. 2A, the method begins with the edge molding tool 40 positioned vertically between the upper mold 20 and the lower mold 30. Then the edge molding tool 40 moves relatively upwardly so that the injection-molding core 41 engages into the injection-molding cavity 22 to form therebetween the injection-molding cavity space 25 as shown in FIG. 2B. The heavy arrows indicate the relative motion of the components. Initial flat sheet materials of the cover layer 2 and substrate 3 are conveyed (e.g. by a material carrying frame and/or transport conveyors that are not shown) into the space between the upper mold 20 and lower mold 30, as shown in FIG. 2B. Then the lower mold 30 moves relatively upwardly and/or the upper mold 20 and edge molding tool 40 move relatively downwardly, so that the flat sheets of material 2 and 3 are received and pressed between the press-molding core 31 of the lower mold 30 and the press-molding cavity 21 of the upper mold 20, whereby the cover layer 2 and substrate 3 are laminated onto one another and three-dimensionally molded to the contour of the press-molding cavity 21. For this press-molding process, it is understood that the cover layer 2 and substrate 3 may have been previously heated and/or pre-laminated together already before being introduced into the one-shot molding apparatus 10, and the lower mold 30 and upper mold 20 may be heated and/or cooled as necessary for carrying out the press-molding of the layers 2 and 3. After the layers 2 and 3 have been three-dimensionally molded into the configuration shown in FIG. 2C, the materials thereof cure and/or cool to harden and permanently set the molded configuration thereof.

Meanwhile, during the relative motion of the components from the stage of FIG. 2B to the stage of FIG. 2C, excess material along the edge of the cover layer 2 and the substrate 3 is neatly trimmed or cut off when the cutting edge 44 of the edge molding tool 40 meets, and slides in close contact past, the counter edge 32 of the lower mold 30 just before the components reach their final closest end position shown in FIG. 2C. By the cooperation of the cutting edge 44 and the counter edge 32, the excess material is cut off both layers 2 and 3 to form the precisely cut edge 1A at a precisely defined location. The excess material that has been cut off is discharged as scrap through a waste discharge channel 45 provided on the edge molding tool 40 (and/or on the side of the lower mold 30). The height or position of the cutting edge 44 is selected or adjusted so that the cutting of the material of the layers 2 and 3 occurs at precisely the correct location at precisely the correct time before, during or preferably after the three-dimensional molding of the layers 2 and 3 in the press-molding cavity 21, so that the cut edge 1A does not (or does not significantly) pull back or recede away from the edge molding tool 40 and the counter edge 32 into the press-molding cavity 21 due to subsequent press-molding deformation of the layers 2 and 3. Namely, during the three-dimensional molding of the layers 2 and 3 in the press-molding cavity 21, the layer materials will become stretched and/or will pull upwardly into the cavity 21 to an extent depending on the three-dimensional contours to be achieved at each particular location. Because of this, the layer material may pull back away from the edge molding tool 40 into the press-molding cavity 21 to differing extents depending on the particular three-dimensional molded contours to be achieved. To avoid variances arising in this regard, the cutting step to form the cut edge 1A is performed preferably after most or all of the molding deformation or pull-back of the layer material has already taken place during the press-molding process, or at the completion of the press-molding process when the upper and lower molds have reached their final closed position, so that the cut edge 1A remains located in contact against the side of the edge molding tool 40 as shown in FIG. 2C. This will allow the formation of a uniformly and precisely configured molded edge, without variances arising due to variable pull-back of the layer materials during the press-molding.

As further shown in FIG. 2C, in the fully closed position of the mold tools 20, 30 and 40, an abutment 24 of the upper mold 20 abuts and seats or seals against the edge molding tool 40 to form a closed or sealed end of the injection-molding cavity space 25. Similarly, an abutment surface of the lower mold tool 30 just below the counter edge 32 abuts and seats or seals against an adjoining side surface of the edge molding tool 40 to close off this end of the injection-molding cavity space 25. This contact of the respective abutment surfaces does not need to be, but may be air-tight. It merely needs to provide a sufficiently tight seal to achieve the required injection-molding pressure in the cavity space 25 and prevent excessive leakage of the injected plastic.

Mold flash of the plastic may occur, however, along these mold parting lines at the abutment surfaces. Also, the mold cavity wall 23 cooperates with a counter surface 33 of the lower mold 30 to pinch or press and thereby tightly squeeze and seal the trim component layers 2 and 3 therebetween, in order to form another sealed area of the injection-molding cavity space 25. Particular configurations of a seal edge formed by the mold cavity wall 23 cooperating with the counter surface 33 will be discussed below in connection with FIGS. 5A to 5F. Thus, the injection-molding cavity space 25 is formed and bounded by the upper mold 20, the lower mold 30 and the edge molding tool 40.

Figure 2E:
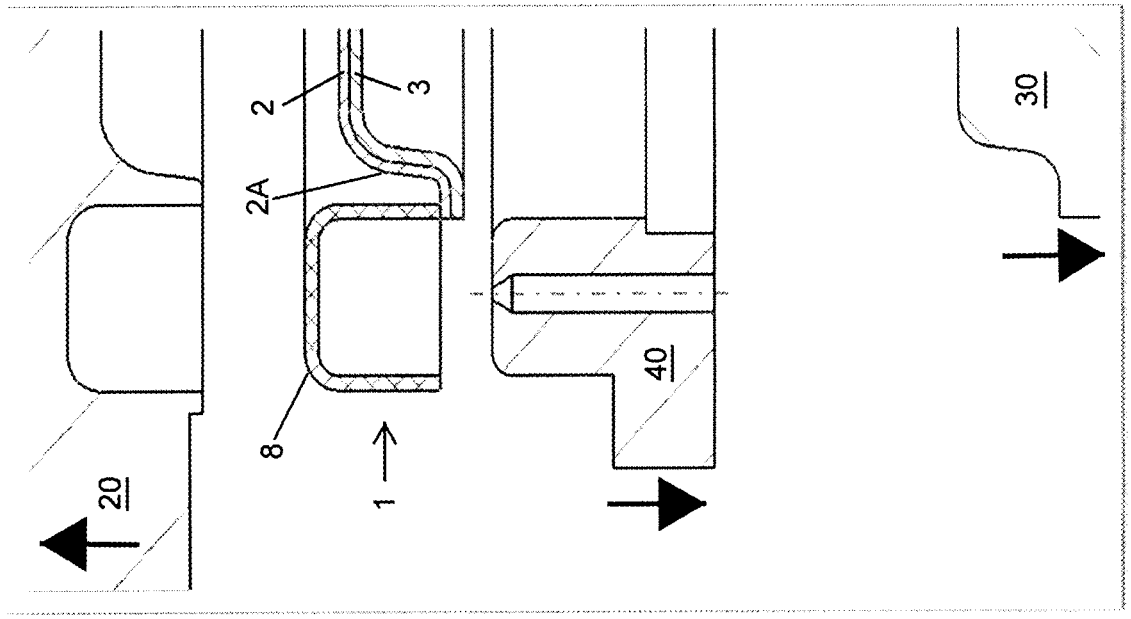
Figure 2D:
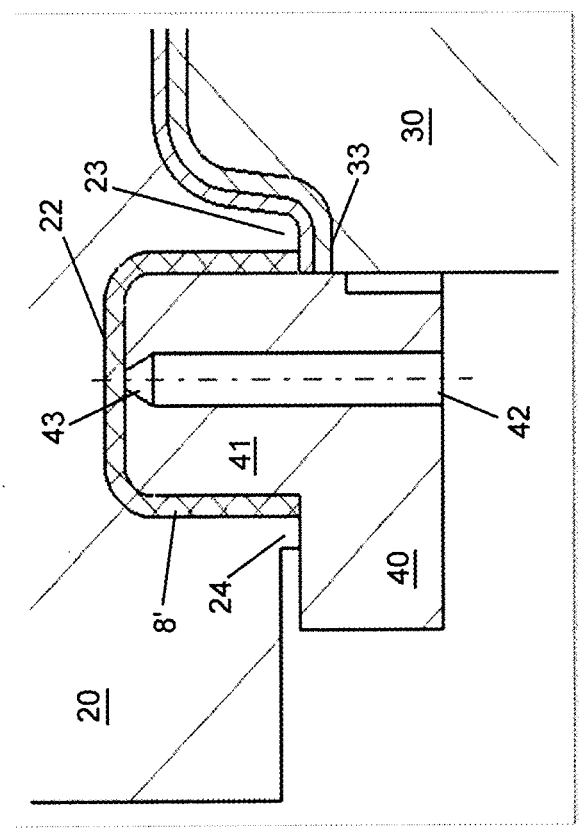

Once the closed and sealed condition of the mold tools as shown in FIG. 2C is achieved, then as shown in FIG. 2D viscous liquid plastic 8' (e.g. molten or heated/softened thermoplastic material or viscous liquid thermosettable plastic material) is injected through the injection channel 42 and nozzle 43 into the injection-molding cavity space 25 between the injection-molding core 41 and the injection-molding cavity 22 so as to form the molded rim, e.g. edge frame 8. A plurality of such injection channels 42 and nozzles 43 are arranged at suitable spacing distances along the edge of the trim component to be formed, as necessary to ensure proper injection of the plastic material 8' and complete filling of the injection-molding cavity space. Additionally or alternatively, injection channels and nozzles can be provided in the lower mold and/or the upper mold to communicate into the injection-molding cavity space 25 (see further examples below). The injected plastic 8' is contained under pressure within the injection-molding cavity space 25 and cannot escape, because of the sealed cavity boundaries produced by the above described abutment surfaces seating against one another, and by the mold cavity wall 23 pressing the trim component material layers 2 and 3 tightly against the counter surface 33 of the lower mold 30. Not illustrated but understood by persons of ordinary skill, one or more of the mold tools may also be provided with vent passages to vent air out of the injection-molding cavity space as the plastic 8' is injected, so that the plastic can fully uniformly fill all areas of the formed molding cavity space.

Through this injection-molding process, the injected plastic 8' contacts and is molded under pressure against an edge portion of the visible front surface 2A of the cover layer 2 of the trim component. Thereby, the injected plastic 8' becomes adhered onto the cover layer 2, and also becomes closely inter-engaged into any pores or spaces of the cover layer material, e.g. of woven or non-woven fabric. In this regard, while an inboard proximal portion of the layers 2 and 3 of the trim component body is squeezed tightly between the mold cavity wall 23 of the upper mold 20 and the counter surface 33 of the lower mold 30 to prevent the injected plastic 8' from seeping or flowing past that pinched-off seal area out of the injection-molding cavity space 25, the outboard distal edge portion of the layers 2 and 3 is not tightly pressed, and for example not completely compressed because it is exposed out of the press-molding cavity 21, so that open spaces and pores remain in the layers 2 and 3, and the injected plastic 8' can thus better penetrate into, wet and interengage with the fibers of the uncompressed outer edge portion of the cover layer 2 and/or the substrate 3 of the trim component body. This achieves an improved permanent adhesion and fixing of the molded rim such as the edge frame 8 onto the trim component body 4.

The mold tools 20, 30 and 40 are maintained in the closed condition of FIG. 2D for the required amount of time during which the injected plastic 8' cures and/or cools, and thereby hardens, to form the molded edge frame 8, while the layers 2 and 3 of the trim component body cure and/or cool to set or harden into the three-dimensionally molded configuration of the trim component. The molding apparatus 10 is then opened by relatively moving the upper mold 20 upwardly, the edge molding tool 40 downwardly, and the lower mold 30 farther downwardly into the positions shown in FIG. 2E, whereupon the finished trim component 1 is pulled or ejected from the mold cavities 21 and 22 (by ejector devices if necessary), or from the injection-molding core 41, so that the finished trim component 1 can be removed from the molding apparatus 10. The molding apparatus is then ready to begin the next process cycle in the position of FIG. 2A. The trim component 1 has thereby been produced in a finished or essentially finished condition, without the need of any further cutting or trimming of the edges thereof, and with the edge frame 8 (or other molded rim) formed and permanently secured onto the edge portion of the trim component body 4, by having been injection-molded in-place during the same one-shot molding process in the same one-shot molding apparatus in which the trim component body was also press-molded into its three-dimensional configuration.

While FIGS. 2A to 2E show successive stages as if the mold tools are successively stopped in the illustrated positions and conditions in these successive stages, it should be understood that the one-shot molding process can actually proceed smoothly with essentially continuous motion of the components progressing through the stages of FIGS. 2A, 2B, 2C, 2D and 2E. The position of the mold tools as shown in FIGS. 2C and 2D is maintained as long as necessary to perform the injection-molding of the injected plastic 8' and the thermoforming or press-molding of the material layers 2 and 3 of the trim component body 4, and to allow those molded parts to cool and/or cure to fix or set the molded configurations thereof sufficiently to allow the finished trim component 1 to be removed from the molding apparatus as illustrated in FIG. 2E. The opening and/or closing of the mold tools relative to one another can proceed smoothly and continuously, or stopped at various stages as desired.

Figure 3C:
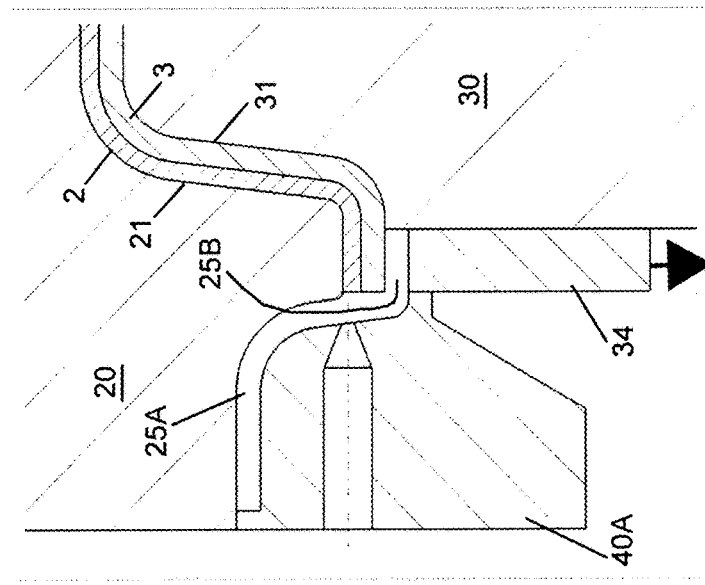
FIGS. 3A to 3E are schematic sectional illustrations of a portion of a molding apparatus according to a second embodiment of the invention for forming a molded rim at an edge of a trim component, respectively showing successive stages of a second embodiment of a molding method carried out with the molding apparatus.
Figure 3B:
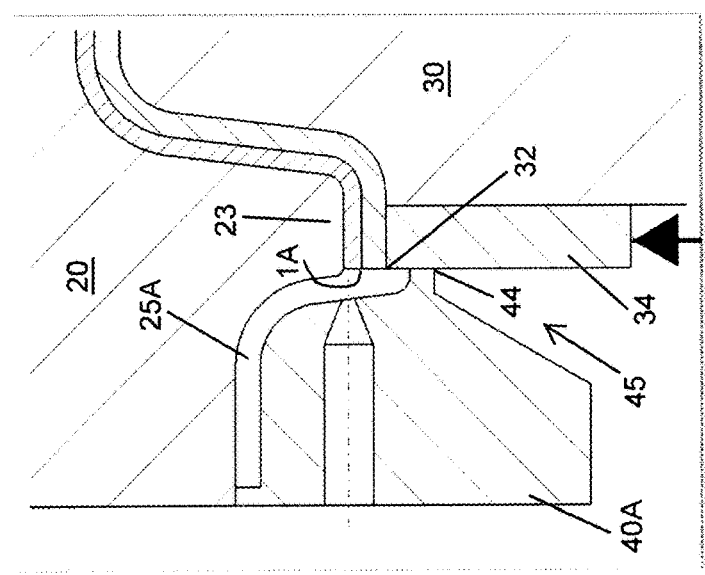
Figure 3A:
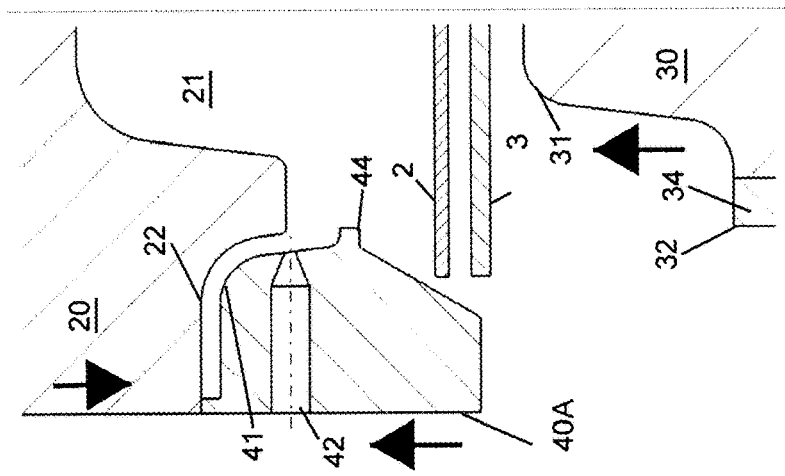

FIGS. 3A to 3E illustrate a second embodiment of a one-shot molding apparatus 10 and a second embodiment of a one-shot molding method performed with this apparatus. This second embodiment shares many similarities with the first embodiment described above in connection with FIGS. 2A to 2E, and the corresponding or similar aspects will not be described again in detail here. It should be understood that all similar and corresponding features, aspects, components and operations of the first embodiment relate analogously also to this second embodiment. The present description will focus on the different or additional aspects in the second embodiment. As can be seen in FIG. 3A, the edge molding tool 40A has a different configuration compared to the edge molding tool 40 of the first embodiment as shown in FIG. 2A. The injection-molding core 41 of the edge molding tool 40A cooperates with the injection-molding cavity 22 of the upper mold tool 20 to form an injection-molded edge frame 8 for the trim component, having a different configuration compared to the edge frame formed in the first embodiment. Similarly as in the first embodiment, the edge molding tool 40A of the second embodiment moves vertically relative to the upper mold 20 and the lower mold 30, which also move vertically relative to one another, i.e. all three mold tools move parallel relative to one another. Different from the first embodiment, the lower mold 30 of the second embodiment in FIG. 3A is additionally provided with a lower mold slider 34, generally referred to as a fourth mold tool, which is movable vertically (i.e. parallel) relative to the lower mold 30. While the edge molding tool 40A still has a cutting edge 44 fixedly arranged thereon (similar to the first embodiment), the counter edge 32 for the cutting operation is provided on the movable lower mold slider 34 rather than fixedly on the main body of the lower mold 30 (as it is in the first embodiment). This arrangement of an additional fourth mold tool as a lower mold slider 34 that is movable relative to the lower mold 30, provides additional adaptability in the process and in the injection-molding configuration that can be achieved, for example as follows.

In the stage shown in FIG. 3A, the edge molding tool 40A has moved upwardly (and/or the upper mold 20 has moved downwardly) to bring the edge molding tool 40A into cooperating contact with the upper mold 20, and the material layers 2 and 3 for the trim component body have been introduced between the press-molding cavity 21 of the upper mold 20 and the press-molding core 31 of the lower mold 30.

Progressing to the stage shown in FIG. 3B, the lower mold 30 along with its associated lower mold slider 34 have moved upwardly toward and into engagement with the edge molding tool 40A and the upper mold 20. Alternatively or additionally, the upper mold 20 and the edge molding tool 40A have moved downwardly toward and into engagement with the lower tools 30 and 34. The starting material layers 2 and 3 as initially provided have excess material protruding beyond the intended finished edge of the trim component body. In the transition from FIG. 3A to FIG. 3B, when the cutting edge 44 of the edge molding tool 40A meets the counter edge 32 of the lower mold slider 34, the excess protruding portion of the material layers 2 and 3 is neatly cut off and ejected as scrap through a waste discharge channel 45. The precise time and sequence of the cutting of the material layers 2 and 3 by the cooperation of the cutting edge 44 and the counter edge 32 is adapted as necessary in a wide range by appropriately adjusting the timing and positioning of the upward motion of the lower mold slider 34 relative to the position and motion of the lower mold 30. Particularly, the time of cutting to form the cut edge 1A is preferably during or after the lamination, compression and three-dimensional contour molding of the material layers 2 and 3 to form the trim component body, so that after cutting, the cut edge 1A will remain at its prescribed position flush with the counter edge 32 of the slider 34 as shown in FIG. 3B, and will not recede or be pulled back toward the right in FIG. 3B due to the three-dimensional molding of the material layers 2 and 3. Thereby it is ensured that a precise finished contour of the edge of the trim component body is achieved uniformly at all locations around the perimeter of the trim component or at least at the areas provided with an injection-molded rim according to the invention.

After cutting the material to form the cut edge 1A, the lower mold slider 34 continues to move upwardly to ultimately compress, laminate and mold the edge portion of the trim component body between an upper surface of the lower mold slider 34 and a downwardly facing surface of the mold cavity wall 23 of the upper mold 20 as shown in FIG. 3B. Then, proceeding to the stage shown in FIG. 3C, the lower mold slider 34 moves downwardly to release and expose the bottom or back surface 3A of the substrate layer 3 of the edge portion of the trim component body being formed, and thereby open an additional area of the injection-molding cavity space 25. Namely, as shown in FIG. 3C, the final injection-molding cavity space 25 includes a first cavity space 25A bounded between the edge molding tool 40A and the injection-molding cavity 22 of the upper mold 20, as well as a second cavity space 25B bounded between the lower mold slider 34, the lower mold 30 and the exposed or uncovered part of the edge portion of the trim component body being formed. This configuration of the injection-molding cavity space 25, 25A, 25B allows the injected plastic 8' to be molded around the cut edge 1A as well as the exposed edge portion of the back side of the trim component body as shown in FIG. 3D. This edge portion is not compressed during the injection-molding, so that open pores of the material 2 and/or 3 can be better penetrated, wetted and engaged by the injected plastic 8'. These features provide enhanced clasping, encapsulation, protection, reinforcement, engagement and adhesion of the injected plastic 8' onto the cut edge and the exposed edge portion of the trim component body. The relatively movable lower mold slider 34 ensures that the edge portion of the trim component body is initially laminated, compressed and molded as required, but then the appropriate size and configuration of injection-molding cavity space can be opened to allow the edge frame 8 to be molded at least partially around the edge portion of the trim component body.

Figure 3E:
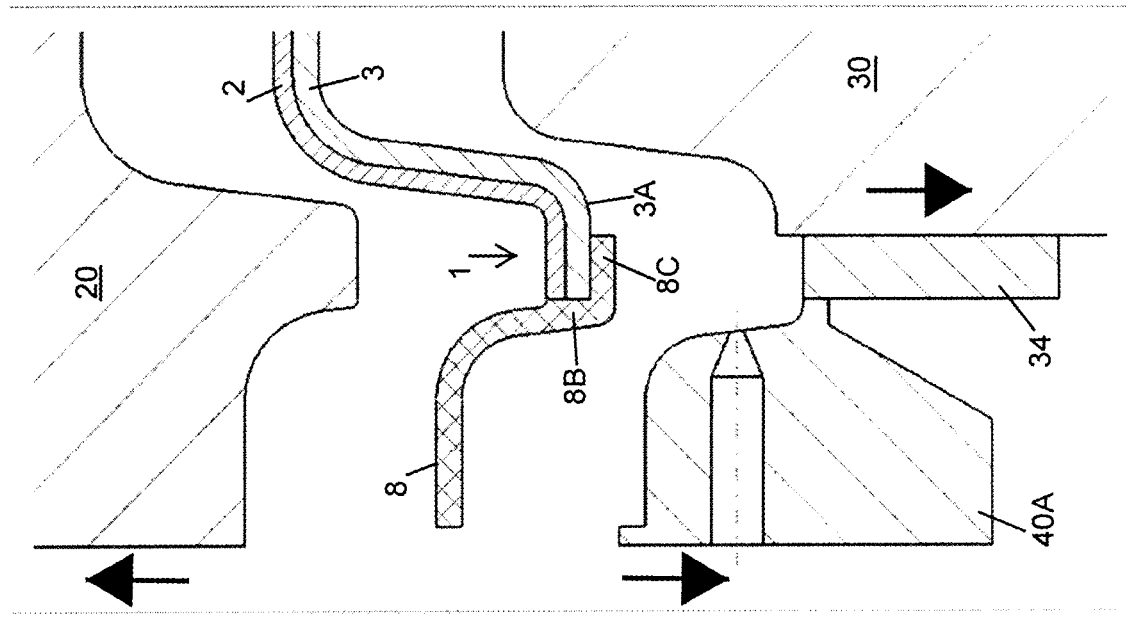
Figure 3D:
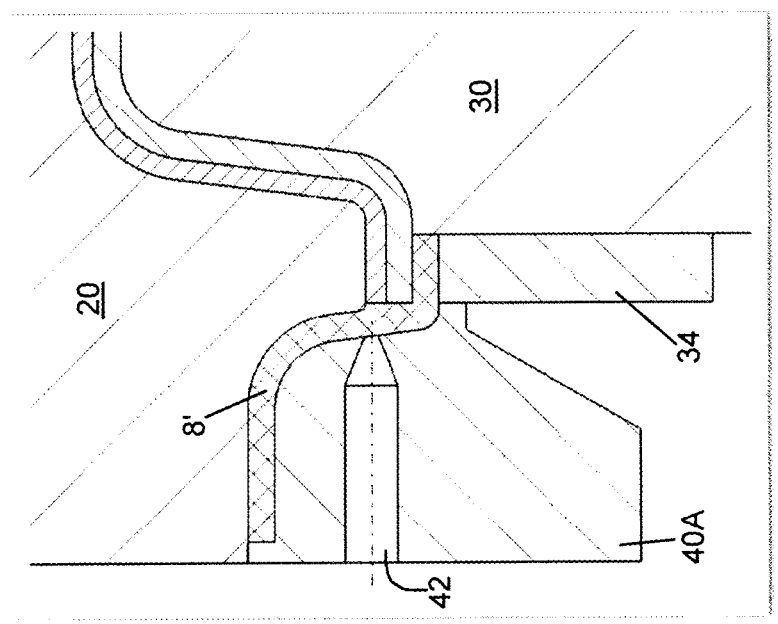

As shown in FIG. 3E, the upper mold 20 has moved upwardly and the lower mold 30 as well as the lower mold slider 34 and the edge molding tool 40A have moved downwardly to open the mold cavities after sufficient curing and/or cooling, and thus hardening or setting, of the injection-molded edge frame 8 and the press-molded trim component body 4 to form the finished or essentially finished trim component 1, which is then removed from the molding apparatus.

Figure 4B:
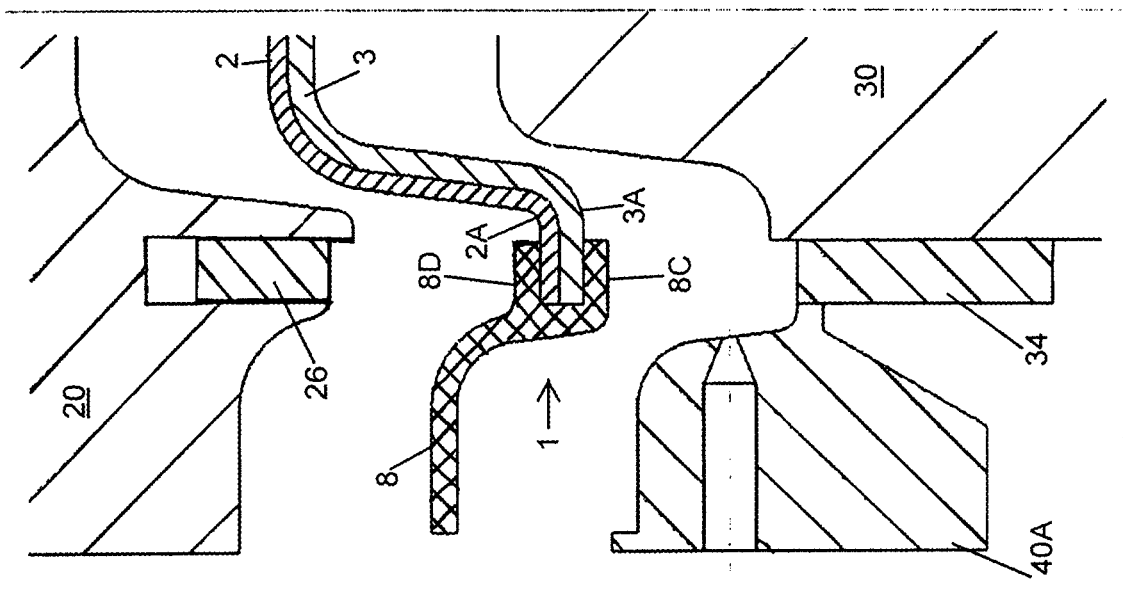
FIGS. 4A and 4B are schematic sectional illustrations of a portion of a third embodiment of a molding apparatus according to the invention, for performing a third inventive embodiment of a molding method, being a variant or further development of the second embodiment.
Figure 4A:
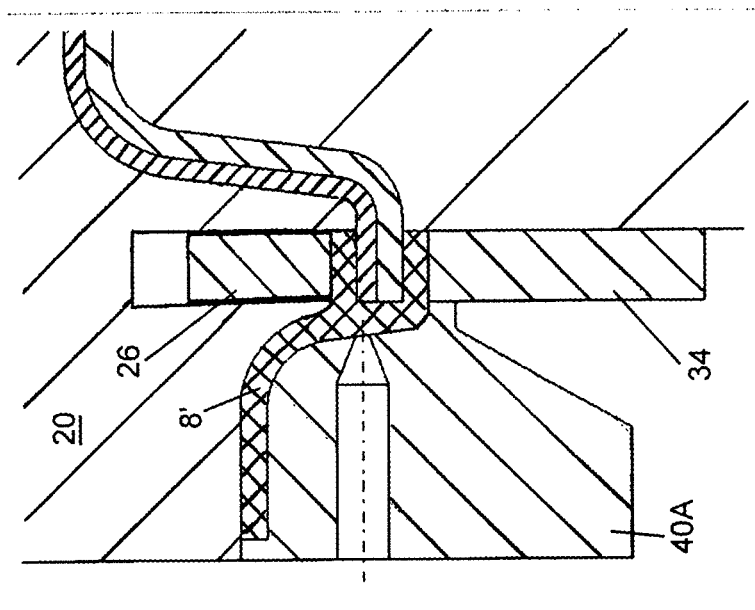

FIGS. 4A and 4B show features of a third embodiment of the inventive apparatus and method, being a further development of the second embodiment as shown in FIGS. 3D and 3E and described above. Most features of this third embodiment correspond to the second embodiment. The significant difference is that this third embodiment further has an upper mold slider 26 or fifth mold tool vertically movably arranged in a recess or nest of the upper mold 20. This movable upper mold slider 26 gives a further degree of adaptability in the configuration and formation of the molded rim, represented by an edge frame 8 in the present example. As described above in the second embodiment in the stage shown in FIG. 3B, the lower mold slider 34 initially cooperates with the lower mold 30 to press and mold the material layers of the trim component body from the bottom side. Similarly, the upper mold slider 26 is in a downward position so that its bottom pressing face is aligned with the wall of the press-molding cavity 21, in a condition generally similar to that shown in FIG. 3B. Thereby the upper mold slider 26 cooperates with the lower mold slider 34 to compress and mold the edge portion of the trim component body therebetween. Then when the lower mold slider 34 is retracted downwardly in FIG. 3C, similarly the upper mold slider 26 is retracted upwardly into its position shown in FIG. 4A, while the upper mold 20 and the lower mold 30 remain in their closed positions, pressing the trim component body therebetween. Then, in the stage shown in FIG. 4A, viscous liquid plastic 8' is injected through the injection channel 42. Because the retraction of the upper mold slider 26 and the lower mold slider 34 has exposed both the top surface and the bottom surface of the edge portion of the trim component body, therefore the injected plastic 8' is molded entirely around the free edge portion of the trim component body as shown in FIG. 4A. The free edge portion is also completely exposed and released from the mold surfaces, so it is not being compressed during the injection-molding, whereby the injected plastic can better penetrate into pores and the like of the material of the edge portion. This produces an edge frame 8 that covers and adheres to the cut edge 1A, and additionally includes both a back rim 8C molded and adhered onto the back surface 3A of the substrate 3, as well as a front rim 8D molded and adhered onto the front surface 2A of the cover layer 2 of the trim component body. This molded rim thus completely encapsulates and clasps around the edge portion of the trim component body, and thereby achieves improved adhesion, bonding and reinforcement of the edge portion of the trim component body.

The above third embodiment with a movable upper mold slider 26 is presented as merely an example of further variable arrangements of molding tools to achieve a great variety of different configurations of molded rims at the edge portion of a trim component body. The provision of additional molding tools that are movable relative to the main upper mold and main lower mold achieves improved uniformity and precision of the resulting molded product, as well as a greater variety and adaptability of the configurations of molded rims that can be achieved.

FIGS. 5A to 5F schematically illustrate several different configurations of edge seals for the injection-molding cavity 22, 25, which can be provided for all embodiments of the molding apparatus according to the invention. As described above, the mold cavity wall 23 of the upper mold 20 presses the trim component body (including layers 2 and 3) tightly against the counter surface 33 of the lower mold 30 in order to effectively seal this area of the injection-molding cavity 22, 25 so that the injected viscous plastic 8' cannot leak out past the mold cavity wall 23 and/or through porous spaces within the trim component layers 2 and 3. The sealing effect can be enhanced by providing various configurations of a seal edge at this location. The special seal edges of FIGS. 5A to 5F especially ensure that the upper mold wall 23 seals against the firm backing of the substrate material 3 by providing sufficient increased pressing force through the softer cover layer 2 and any interposed intermediate layer such as a foam layer.

Figure 5C:
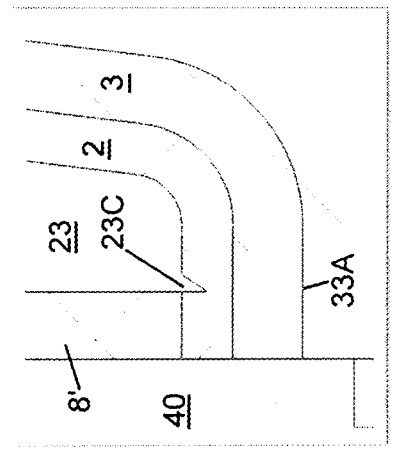
FIGS. 5A to 5F are schematic sectional illustrations of an edge area portion of a molding apparatus in a fully closed condition during the injection-molding process, respectively showing variants of seal arrangements for sealing the injection-molding cavity, as applicable to all other embodiments.
Figure 5F:
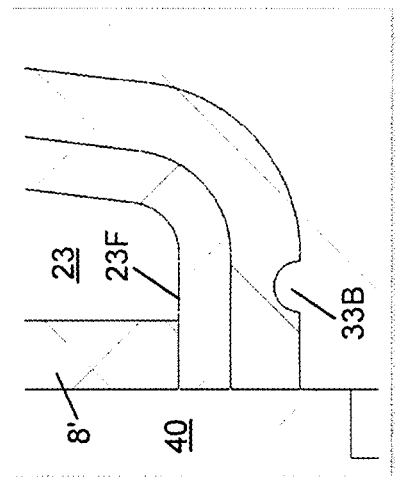
Figure 5B:
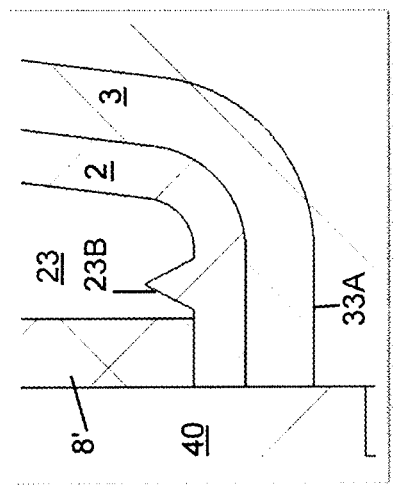
Figure 5E:
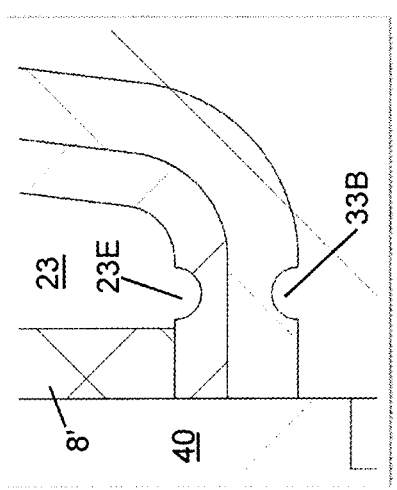
Figure 5A:
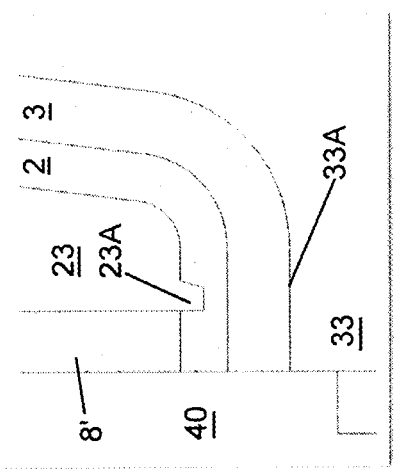
Figure 5D:
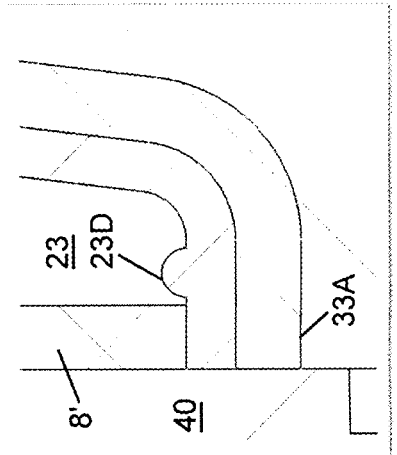

For example, in FIG. 5A, the mold cavity wall 23 has a protruding ridge 23A with a tapered polygon shape, while the counter surface 33 is a flat surface 33A. The trim component layers 2 and 3 are squeezed and pinched tightly between the protruding seal ridge 23A and the flat counter surface 33A. In FIG. 5B, the mold cavity wall 23 is provided with a V-shaped groove or indent 23B, facing the flat surface 33A of the counter surface 33. This groove or indent 23B produces increased squeezing or pinching pressure at the remaining forward or bottom edge portions of the mold cavity wall 23 to tightly squeeze the trim component layers 2 and 3 against the flat counter surface 33A. Also, the groove or indent 23B produces an increased surface area, increased surface contact, and increased potential leakage path distance of any injected viscous plastic 8' that would attempt to leak past the area at which the bottom end of the mold cavity wall 23 is pressed against the cover layer 2 of the trim component. This is also true of the other protrusion or ridge, and groove or indent, configurations shown in FIGS. 5A to 5E. In FIG. 5C, a V-shaped or knife edge-shaped protrusion or ridge 23C of the mold cavity wall 23 cooperates with a flat counter surface 33A in the same manner as described above in connection with FIG. 5A. In FIG. 5D, a rounded groove or indent 23D cooperates with a flat counter surface 33A in the same or similar manner as described above in connection with FIG. 5B. In FIG. 5E, a rounded protrusion or ridge 23E cooperates with a rounded protrusion 33B on the counter surface 33 to tightly squeeze the layers of the trim component therebetween and achieve a seal against leakage of the injected viscous plastic 8'. In FIG. 5F, the mold cavity wall 23 merely has a flat surface 23F, which cooperates with a rounded protrusion 33B on the counter surface 33 to achieve the tightly squeezed seal effect. Namely, the protrusion 33B increases the compression or squeezing pressure applied to and through the trim component layers, thereby also applying an increased pressure at the counteracting area of the flat surface 23F of the mold cavity wall 23. The edge seals can have various polygon or curved, convex or concave shapes, and the illustrated shapes of edge seals 23A to 23F are merely examples. These seal features of FIGS. 5A to 5F are optional, and are effective to increase the seal tightness whenever necessary.

Furthermore, these seal features 23A to 23E serve to tightly grasp and clamp the edge portion of the layers 2 and 3, thereby helping to hold the edge portion in place and prevent the cut edge 1A from pulling-back or receding away from the edge molding tool 40 into the press-molding cavity 21. Thus, with the use of such seal features 23A to 23E, the cutting of the cut edge 1A by the cutting edge 44 and counter edge 32 or 27 can be performed earlier during the process, e.g. before the molds 20 and 30 have completely closed or before the molding deformation of the layers 2 and 3 has been completed.

FIGS. 6A to 6D schematically illustrate a fourth embodiment of a molding apparatus according to the invention, in successive stages of a fourth embodiment of a molding method performed with this molding apparatus. This embodiment shares many components and features in common with the first, second and third embodiments described above, and a detailed description thereof will not be repeated here. The present description will focus on the different aspects of the fourth embodiment. A significant difference is that the edge molding tool 40B is configured and arranged to be movable, particularly linearly slidable, horizontally back and forth, thus perpendicularly relative to the motion direction of the upper mold 20 and the lower mold 30. The edge molding tool 40B can additionally move vertically relative to the mold tools 20 and 30 as indicated by the heavy arrows. In further variants (not illustrated), the edge molding tool may be configured and arranged to move at an oblique or sloping angle, i.e. not perpendicularly and not parallel, relative to the motion direction of the upper and lower mold tools, depending on the particular configuration of the edge portion of the trim component that is to be produced and depending on the configuration and arrangement of the upper and lower molds. Another difference of this fourth embodiment is that the plastic injection channel 35 and the injection nozzle or gate 37 are provided in the lower mold 30 rather than in the edge molding tool 40B. It should be understood, however, that in each embodiment one or more injection channels can be provided in the lower mold and/or in the edge molding tool and/or in the upper mold as necessary or desired to achieve the required injection of the plastic for forming the desired configuration of the edge molding and/or additional components injection-molded on the back side of the trim component body. A further different feature of this fourth embodiment is that the edge molding tool 40B includes an edge molding cavity 46 having the pertinent cross-sectional shape for forming the desired shape of an edge bead along the cut edge of the trim component body, as will be discussed next.

In the method stage shown in FIG. 6A, the initial material of the cover layer 2 and the substrate 3 of the trim component body have been introduced (for example pre-laminated together, and pre-compressed to a calibrated thickness and/or density, while also having been pre-heated in previous processes and devices which are not shown). The layers 2 and 3 are introduced and held between the press-molding core 31 of the lower mold 30 and the press-molding cavity 21 of the upper mold 20, for example by a sheet material carrier frame, which is not shown.

In transitioning to the stage shown in FIG. 6B, the upper mold 20 and lower mold 30 have moved vertically relatively toward and into engagement with one another, as indicated by the heavy motion arrows. Thereby the material layers 2 and 3 have become three-dimensionally molded to the contour shape of the press-molding core 31 cooperating with the press-molding cavity 21. Excess material of the layers 2 and 3 remained protruding outwardly (downwardly) beyond the edge of the molding cavity 21 and the molding core 31. Meanwhile, the edge molding tool 40B has been moved upwardly (either together with or independently from the upward motion of the lower mold 30) to come into tight contact with a bottom face of the upper mold 20. Then, when the press-molding of the trim component body is essentially completed (no further receding of the edge of the material), the edge molding tool 40B is driven to move (e.g. slide) horizontally toward the right. Thereby, the cutting edge 44 of the edge molding tool 40B cooperates with the counter edge 32 of the lower mold 30 to cut off the excess material of the trim component layers 2 and 3, which is then discharged as scrap through a waste discharge channel or clearance area 45. Thereby, a clean cut edge 1A is formed at the edge of the trim component body, and this cut edge does not undergo any further shrinkage or pull-back into the press-molding cavity 21, because the three-dimensional molding of the trim component body has already been completed or essentially completed when the edge 1A is cut.

In the stage shown in FIG. 6C, the edge molding tool 40B has been driven farther toward the right until its edge molding cavity 46 has come into alignment or registration with the cut edge 1A of the trim component body. The edge molding cavity 46 can have any desired concave configuration to form the desired contour shape of the molded rim or edge bead 6 along the cut edge 1A of the trim component body. In the present example, the edge molding cavity 46 has an essentially semi-circular cross-sectional shape to form a semi-circular edge bead 6. The width or diameter of the recess 46 is slightly greater than the thickness of the cut edge 1A, so that the open cavity 46 overlaps slightly beyond the back side of the substrate layer 3, so as to provide for communication from the injection channel 35 and the injection nozzle 37 into the edge molding cavity 46.

Then, further as shown in FIG. 6C, viscous liquid plastic material 6' is injected through the channel 35 and nozzle 37, from there a slight distance along the back side 3A of the substrate layer 3 and into and filling the edge molding cavity 46. The mold tools are maintained in this position for a sufficient time to allow the injected plastic 6' to cure and/or cool and thereby harden to form the edge bead 6. The mold tools are then opened in the reverse or opposite directions from those indicated in FIG. 6B, the trim component is released from the molding cavities and removed in its final form as shown in FIG. 6D. In this example, the edge bead 6 is basically confined to the area of the cut edge 1A but also slightly overlaps and is molded around the back side of the substrate layer 3. This provides improved bonding and adhesion of the edge bead 6 onto the trim component body, and also results from the fact that the injection channel 35 is provided in the lower mold 30. If it is desired to form an edge bead 6 purely limited to the cut edge 1A, the injection channel is instead provided in the edge molding tool 40B.

Figure 7A:
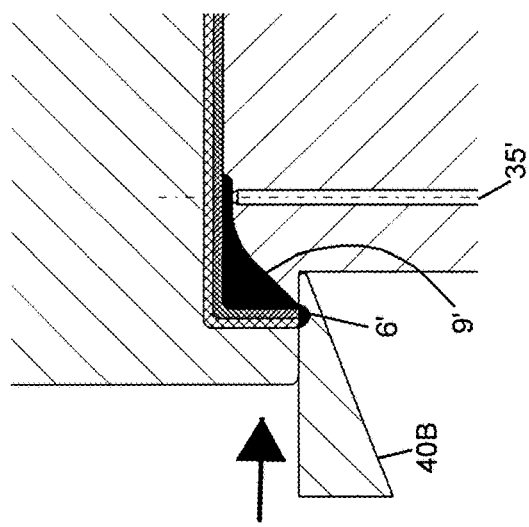
FIGS. 7A to 7D are schematic sectional illustrations similar to FIGS. 6A to 6D, but showing an additional feature or variant of the fourth embodiment.
Figure 7B:
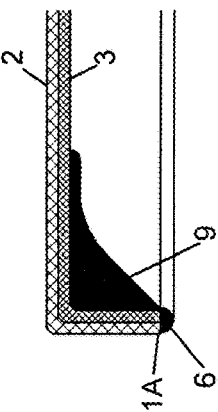
Figure 7C:
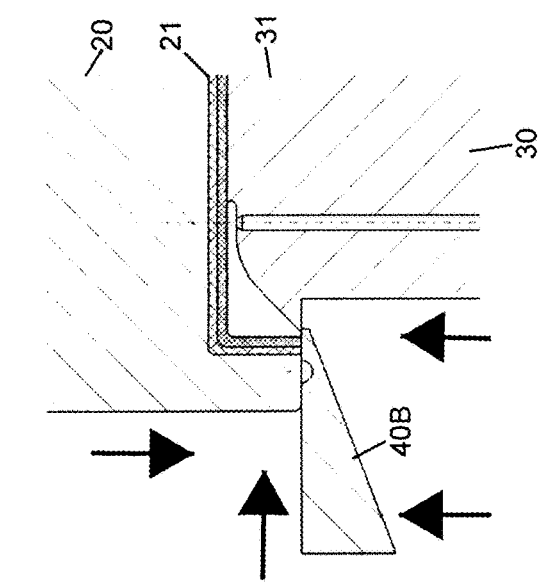
Figure 7D:
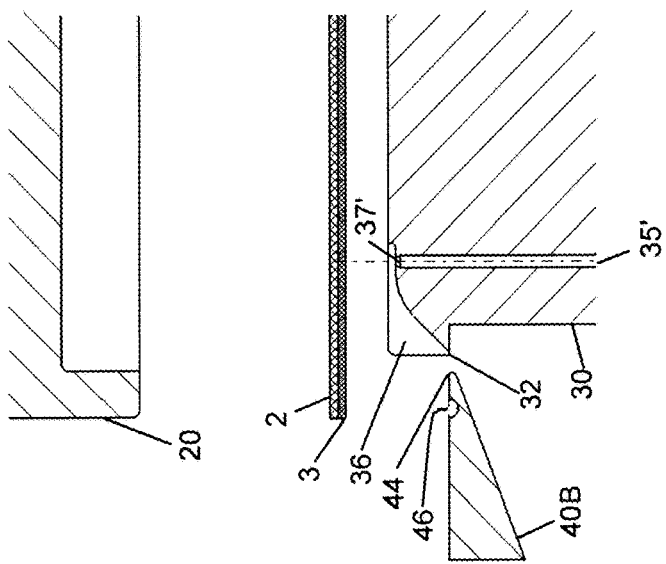

FIGS. 7A to 7D illustrate a variant or additional feature of the fourth embodiment shown and described in connection with FIGS. 6A to 6D above. This variant or additional feature generally corresponds to the fourth embodiment, except that the lower mold 30 is additionally provided with a rib channel or recess 36 for forming a reinforcement rib 9 on the back side 3A of the substrate 3 of the trim component body. Such ribs are provided at discrete locations spaced apart from one another along the perimeter of the trim component. Thus, the features of FIGS. 7A to 7D can be considered as belonging to the same apparatus and method illustrated in FIGS. 6A to 6D, except that FIGS. 7A to 7D illustrate a different section plane at a different location along the perimeter of the molding cavity 21 and thus a different location along the perimeter of the trim component. Thus, the method steps of FIGS. 7A to 7D also correspond to those of FIGS. 6A to 6D except that in FIGS. 7A to 7D additional viscous liquid plastic 9' is injected through the injection channel 35' and nozzle 37' into the rib channel or recess 36 along the back surface of the substrate layer 3. The rib channel 36 also communicates into the edge molding cavity 46 so that the viscous liquid plastic 6' also flows from the rib channel 36 into the cavity 46 to form the edge bead 6. It should thus be understood that the edge bead 6 is continuous along the cut edge 1A (at least along a pertinent length or section of the perimeter shown in FIGS. 6 and 7), while the reinforcement rib 9 or several such ribs are provided only at discrete locations spaced apart from one another along the perimeter of the trim component as shown in FIG. 7D.

FIGS. 8A to 8D illustrate a fifth embodiment of an apparatus and method according to the invention. In common with the above described embodiments, the apparatus of the fifth embodiment includes a lower mold 30 cooperating with a mold cavity 21 of an upper mold 20 to press-mold the cover layer 2 and substrate 3 of a trim component body therebetween. The apparatus further includes an edge molding tool 40C that is relatively movable vertically (e.g. parallel) relative to the upper mold and the lower mold. The edge molding tool 40C has a cutting edge 44 that cooperates with a counter edge 27 provided on the upper mold 20. A plastic injection channel 35 is provided in the lower mold 30.

At the stage of the method shown in FIG. 8A, the material layers 2 and 3 for the trim component body (e.g. pre-laminated, pre-heated and pre-compressed to a calibrated thickness and/or density) have been introduced between the upper and lower molds, for example by a carrier frame not shown. Transitioning to FIG. 8B, the upper mold 20 and lower mold 30 have moved vertically relatively toward and into engagement with one another to press the material layers 2 and 3 therebetween. As the molding core of the lower mold 30 pressed into the molding cavity of the upper mold 20 excess material of the layers 2 and 3 remained protruding out of the press-molding cavity. This excess material was then caught between and cut by the shearing action of the cooperation of the cutting edge 44 of the edge molding tool 40C and the counter edge 27 of the upper mold 20. The cut-off excess material was discharged as scrap through a discharge channel or clearance area 45. The cutting occurs when the three-dimensional molding of the trim component body has been completed, or almost completed to allow a slight amount of pull-back or receding of the cut edge 1A no farther upward than the position shown in FIG. 8B.

At the stage shown in FIG. 8B, the edge molding tool 40C has moved farther upwardly (beyond the cutting position) and submerged into the molding cavity 21 of the upper mold 20 by a specified distance, to contact and press the cut edge 1A at a precisely defined position within the molding cavity. This ensures that the cut edge 1A is at a precisely defined uniform position (beyond and clear of the injection nozzle 37) to achieve a consistent, uniform dimension and appearance of the finished product trim component. Transitioning to the stage of FIG. 8C, the lower mold 30 and upper mold 20 are maintained in the closed positions thereof, pressing the material layers 2 and 3 therebetween, but the edge molding tool 47 has been retracted a slight distance downwardly. At this stage viscous liquid plastic 6' is injected through the injection channel 35 and nozzle 37 into the space bounded by the upper mold 20, the lower mold 30 and the edge molding tool 40C as well as the cut edge 1A of the trim component body at a precisely defined location.

Finally, FIG. 8D shows the configuration of the finished trim component with an injection-molded plastic edge bead 6 molded and adhered onto the cut edge 1A of the cover layer 2 and substrate 3 of the trim component body. In this example, the edge bead 6 has a generally square cross-section formed by the corresponding shape of the edge molding cavity formed by the upper mold, lower mold and edge molding tool. The upper face of the edge molding tool 40C can be provided with different cross-sectional contour shapes in order to achieve the required finished shape of the edge bead 6.

FIGS. 9A to 9D illustrate an additional feature or further variant of the fifth embodiment disclosed above in connection with FIGS. 8A to 8D. This additional feature or variant corresponds to the fifth embodiment, except that the lower mold 30 additionally has a rib channel or recess 36 for forming a reinforcement rib 9 on the back side 3A of the trim component (similarly like the variant or additional feature of the fourth embodiment described above in connection with FIGS. 7A to 7D). Thus, the above descriptions apply here as well. Namely, FIGS. 9A to 9D can be considered to be a variation of FIGS. 8A to 8D, or can be considered as applying to the same molding apparatus as FIGS. 8A to 8D, except that FIGS. 9A to 9D illustrate a section plane at a different location along the perimeter of the mold cavity and of the trim component, in comparison to the section plane location of FIGS. 8A to 8D. The method steps thus also correspond to those described above in connection with FIGS. 8A to 8D, except that in FIG. 9C viscous liquid plastic 9' is injected through the injection channel 35' and the nozzle 37' into the rib channel 36 that further connects and communicates with the plastic 6' in the edge molding cavity. Thus, the finished trim component shown in FIG. 9D includes an edge bead 6 as well as one or more reinforcement ribs 9.

The concept of forming an injection-molded reinforcement rib 9 connected to the edge bead 6 can be extended to provide additional reinforcement ribs 9 as well as retainers 10 and other structures on the back side 3A of the substrate 3 as shown in FIG. 10. To produce these additional injection-molded structures, the lower mold 30 is provided with additional interconnecting injection-molding channels and/or runners leading to the required injection-molding cavities for forming the required injection-molded structures. The ribs 9 serve to stiffen or strengthen the overall trim component, and the retainers or mounting structures 10 provide strong mounting points that can be connected to respective cooperating mounting fixtures on the motor vehicle body or the like, for fastening the trim component in its installed condition. Also, additional injection-molded plastic structures can be provided, for example as reinforcement rings around openings of the trim component. Basically, any required configuration of an injection-molded component can be easily injection-molded onto the back side of the substrate of the trim component during the one-shot molding process. FIG. 10 also shows an edge bead 6 along the edge of the trim component, as well as an edge flange 7 formed along a portion of the edge. Also, by providing similar injection channels and mold recesses (not shown) in the mold cavity 21 of the upper mold 20, it is also possible to injection-mold structures onto the front surface 2A of the trim component.

The above described methods and apparatuses may similarly be configured and used to form a cut edge and a molded rim not only at an outer perimeter edge of the trim component body, but also at a location within the field of the trim component body. In such an application, the drawing figures such as FIGS. 2A to 2E are understood to illustrate a portion of the apparatus and the trim component not located at an outer perimeter thereof, but rather located along an internal cut-out or opening within the field of the trim component body.

While the mold tools are primarily made of metal, the molding surfaces thereof (e.g. the mold cavity and mold core) can be treated or coated with a mold release agent or a release surface. Furthermore, the abutment surfaces at which the first, second and third mold tools contact one another to enclose the injection-molding cavity can each be metal surfaces with sufficient surface smoothness to ensure adequate mating and closure of the mold tools relative to one another, to achieve sufficient tightness of the injection-molding cavity to carry out the injection-molding. Alternatively, the abutment surfaces, or at least one of each mating pair of these surfaces, may include a plastic surface layer or be provided with an additional seal member to achieve the required degree of sealing of the injection-molding cavity. Furthermore, air vents and the like are provided whenever necessary for properly performing the injection-molding process.

Throughout the above disclosure it should be understood that references to "upper" and "lower", "top" and "bottom", "up" and "down", and the like can be respectively reversed within the scope of this invention. Namely, in effect, the drawing figures could all be turned upside down, and the operation of the one-shot molding apparatus and method would still be the same. Similarly, the molding apparatus could be operated side-to-side, e.g. as would appear by turning the drawing figures on their side by a 90° rotation. It should also be understood that the drawings are not intended to be drawn to any particular scale, and all of the drawing figures are not to the same scale. The drawings are merely general simplified schematic representations to highlight the inventive features. A person of ordinary skill in the art will be able to incorporate these inventive features in many different specific detailed configurations of the molding apparatus and molding method in actual practice.

The above described embodiments of the one-shot molding apparatus and one-shot molding method according to the invention make it possible to produce a trim component having an injection-molded rim formed continuously or at particular discrete locations along the edge of a trim component body, with the press-molding of the trim component body and the injection-molding of the molded rim being performed in one motion sequence and one molding cycle in a single molding apparatus station, without needing to move or otherwise handle the trim component body between its press-molding and the operation of injection-molding the molded rim thereon. The trim component can be removed from the one-shot molding apparatus as a finished or essentially finished component, without the need of any additional trimming or edge-finishing. The injection-molded rim along the edge of the trim component body is neat, clean, uniform, consistent and precisely configured according to the required specifications. Furthermore, any additional required injection-molded plastic structures can be molded onto the back side and/or the front side of the trim component during the same one-shot molding process in the same one-shot molding apparatus.

Although the invention has been described with reference to specific embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A molding apparatus for forming a trim component which includes a trim component body that is press-molded and an injection-molded rim that is injection-molded on an edge portion of the trim component body, wherein the molding apparatus comprises:
   a first mold tool that has a first press-molding surface;
   a second mold tool that has a second press-molding surface; and
   a third mold tool that has a third injection-molding surface and a cutting edge;
   wherein:
   the first mold tool or the second mold tool has a counter edge;
   the first and second mold tools are movable relative to one another in a first direction to bring the first and second mold tools into a closed position with the first and second press-molding surfaces juxtaposed facing one another with a press-molding cavity formed therebetween, adapted to press-mold the trim component body in the press-molding cavity;
   the third mold tool is movable relative to the first mold tool and relative to the second mold tool in a second direction so that the cutting edge of the third mold tool cooperates with the counter edge of the first or second mold tool to cut off an excess material of the trim component body and form a cut edge terminating the edge portion of the trim component body, and so that the third mold tool is brought into a closed position relative to the first and/or second mold tool wherein the third injection-molding surface bounds at least a portion of an injection-molding cavity in which at least an exposed part of the edge portion of the trim component body is received and exposed;
   at least one of the first mold tool, the second mold tool or the third mold tool has therein at least one injection channel that communicates into the injection-molding cavity;
   the mold tools are configured, arranged and adapted to have an injection-moldable material injected through the at least one injection channel into the injection-molding cavity when the third mold tool is in the closed position thereof so as to form and mold the injection-molded rim onto the exposed part of the edge portion of the trim component body; and
   the mold tools are configured and arranged so that the exposed part of the edge portion of the trim component body that is exposed in the injection-molding cavity includes the cut edge of the trim component body.

2. The molding apparatus according to claim 1, wherein the third mold tool has the at least one injection channel therein.

3. The molding apparatus according to claim 2, wherein the second mold tool also has a respective one of the at least one injection channel therein.

4. The molding apparatus according to claim 1, wherein the second mold tool has the at least one injection channel therein.

5. The molding apparatus according to claim 4, wherein:
   the second mold tool has an additional channel or recess formed in the second press-molding surface and communicating with the at least one injection channel, and
   the additional channel or recess is configured and arranged to form, of the injection-moldable material, an injection-molded reinforcement rib, hole-bounding rim, retainer, or mounting structure on a back surface of the trim component body that is press-molded by the second press-molding surface of the second mold tool.

6. The molding apparatus according to claim 1, wherein:
   the first mold tool further has a first abutment surface,
   the second mold tool further has a second abutment surface,
   the third mold tool further has two third abutment surfaces, and
   the mold tools are configured and arranged so that in the closed position of the third mold tool, the two third abutment surfaces of the third mold tool respectively abut against the first abutment surface of the first mold tool and the second abutment surface of the second mold tool to enclose the injection-molding cavity.

7. The molding apparatus according to claim 1, wherein the first mold tool further has a first injection-molding surface which, in the closed position of the third mold tool, bounds another portion of the injection-molding cavity.

8. The molding apparatus according to claim 7, wherein the second mold tool further has a second injection-molding surface which, in the closed position of the third mold tool, bounds a further portion of the injection-molding cavity.

9. The molding apparatus according to claim 1, wherein the second mold tool further has a second injection-molding surface which, in the closed position of the third mold tool, bounds another portion of the injection-molding cavity.

10. The molding apparatus according to claim 1, wherein the mold tools are configured and arranged so that the exposed part of the edge portion of the trim component body that is exposed in the injection-molding cavity includes only the cut edge of the trim component body.

11. The molding apparatus according to claim 1, wherein the mold tools are configured and arranged so that the exposed part of the edge portion of the trim component body that is exposed in the injection-molding cavity includes the cut edge, a portion of a front surface of the trim component body adjoining the cut edge and a portion of a back surface of the trim component body adjoining the cut edge.

12. The molding apparatus according to claim 1, wherein the second direction of motion of the third mold tool is parallel to the first direction of motion of the first and second mold tools.

13. The molding apparatus according to claim 1, wherein the second direction of motion of the third mold tool is perpendicular to the first direction of motion of the first and second mold tools.

14. The molding apparatus according to claim 1, wherein the second direction of motion of the third mold tool is oblique to the first direction of motion of the first and second mold tools.

15. The molding apparatus according to claim 1, wherein the first mold tool has the counter edge that cooperates with the cutting edge of the third mold tool.

16. The molding apparatus according to claim 1, wherein the second mold has the counter edge that cooperates with the cutting edge of the third mold tool.

17. The molding apparatus according to claim 1, wherein the second mold tool includes a second mold tool main body and a fourth mold tool that is movably attached to the second mold tool main body so as to be movable relative to the second mold tool main body between a pressing position and a retracted position, and that has a pressing surface configured and arranged to press and retract from a part of the edge portion of the trim component body respectively in the pressing position and the retracted position of the fourth mold tool.

18. A method of using the apparatus of claim 1 for forming the trim component which includes the trim component body that is press-molded and the injection-molded rim that is injection-molded on the edge portion of the trim component body, wherein the method comprises the steps:
   a) providing a sheet material between the first mold tool and the second mold tool of the molding apparatus;
   b) closing the first and second mold tools relative to one another, and thereby press-molding the sheet material in the press-molding cavity defined between the first and second mold tools to form the trim component body;
   c) moving the third mold tool of the molding apparatus relative to at least one of the first mold tool or the second mold tool, and thereby cutting an edge part of the sheet material between the cutting edge of the third mold tool and the counter edge of the first or second mold tool, to form the cut edge of the trim component body;
   d) closing the third mold tool relative to the first and second mold tools to form the injection-molding cavity in which the edge portion including or adjoining the cut edge of the trim component body is received;
   e) injecting an injectable plastic into the injection-molding cavity to contact the exposed part of the edge portion in the injection-molding cavity;
   f) cooling, curing and/or hardening the injectable plastic to form the injection-molded rim on the edge portion of the trim component body; and
   g) opening the first, second and third mold tools and releasing the trim component therefrom.

19. A molding apparatus for forming a trim component which includes a trim component body that is press-molded and an injection-molded rim that is injection-molded on an edge portion of the trim component body, wherein the molding apparatus comprises:
   a first mold tool that has a first press-molding surface; a second mold tool that has a second press-molding surface; and
   a third mold tool that has a third injection-molding surface and a cutting edge;
   wherein:
   the first mold tool or the second mold tool has a counter edge;
   the first and second mold tools are movable relative to one another in a first direction to bring the first and second mold tools into a closed position with the first and second press-molding surfaces juxtaposed facing one another with a press-molding cavity formed therebetween, adapted to press-mold the trim component body in the press-molding cavity;
   the third mold tool is movable relative to the first mold tool and relative to the second mold tool in a second direction so that the cutting edge of the third mold tool cooperates with the counter edge of the first or second mold tool to cut off an excess material of the trim component body and form a cut edge terminating the edge portion of the trim component body, and so that the third mold tool is brought into a closed position relative to the first and/or second mold tool wherein the third injection-molding surface bounds at least a portion of an injection-molding cavity in which at least an exposed part of the edge portion of the trim component body is received and exposed;
   at least one of the first mold tool, the second mold tool or the third mold tool has therein at least one injection channel that communicates into the injection-molding cavity;
   the mold tools are configured, arranged and adapted to have an injection-moldable material injected through the at least one injection channel into the injection-molding cavity when the third mold tool is in the closed position thereof so as to form and mold the injection-molded rim onto the exposed part of the edge portion of the trim component body;
   the first mold tool includes a first mold tool main body and a fifth mold tool that is movably attached to the first mold tool main body so as to be movable relative to the first mold tool main body between a pressing position and a retracted position;
   the first mold tool main body has the first press-molding surface and further has a first injection-molding surface which, in the closed position of the third mold tool, bounds another portion of the injection-molding cavity;
   the fifth mold tool forms at least a part of a mold cavity wall that separates the first injection-molding surface from the first press-molding surface; and
   the fifth mold tool has an end surface that faces and cooperates with a counter surface of the second mold tool to press and retract from a part of the edge portion of the trim component body between the end surface and the counter surface respectively in the pressing position and the retracted position of the fifth mold tool when the first and second mold tools are in the closed position thereof.

20. A molding apparatus for forming a trim component which includes a trim component body that is press-molded and an injection-molded rim that is injection-molded on an edge portion of the trim component body, wherein the molding apparatus comprises:
   a first mold tool that has a first press-molding surface;
   a second mold tool that has a second press-molding surface; and
   a third mold tool that has a third injection-molding surface and a cutting edge;
   wherein:
   the first mold tool or the second mold tool has a counter edge;
   the first and second mold tools are movable relative to one another in a first direction to bring the first and second mold tools into a closed position with the first and second press-molding surfaces juxtaposed facing one another with a press-molding cavity formed therebetween, adapted to press-mold the trim component body in the press-molding cavity;
   the third mold tool is movable relative to the first mold tool and relative to the second mold tool in a second direction so that the cutting edge of the third mold tool cooperates with the counter edge of the first or second mold tool to cut off an excess material of the trim component body and form a cut edge terminating the edge portion of the trim component body, and so that the third mold tool is brought into a closed position relative to the first and/or second mold tool wherein the third injection-molding surface bounds at least a portion of an injection-molding cavity in which at least an exposed part of the edge portion of the trim component body is received and exposed;

at least one of the first mold tool, the second mold tool or the third mold tool has therein at least one injection channel that communicates into the injection-molding cavity;

the mold tools are configured, arranged and adapted to have an injection-moldable material injected through the at least one injection channel into the injection-molding cavity when the third mold tool is in the closed position thereof so as to form and mold the injection-molded rim onto the exposed part of the edge portion of the trim component body;

the first mold tool further has a first injection-molding surface which, in the closed position of the third mold tool, bounds another portion of the injection-molding cavity; and the first mold tool further has a mold cavity wall that separates the first injection-molding surface from the first press-molding surface, and an end surface of the mold cavity wall between the first injection-molding surface and the first press-molding surface faces and cooperates with a counter surface of the second mold tool to press a part of the edge portion of the trim component body between the end surface and the counter surface in the closed position of the first and second mold tools.

21. The molding apparatus according to claim 20, wherein the end surface of the mold cavity wall has an edge seal feature selected from a ridge, a protrusion, a groove and an indentation, which provides an increased seal of the injection-molding cavity relative to the part of the edge portion of the trim component body pressed between the end surface and the counter surface in the closed position of the first and second mold tools.

22. The molding apparatus according to claim 20, wherein:
the second mold tool includes a second mold tool main body and a fourth mold tool that is movably attached to the second mold tool main body so as to be movable relative to the second mold tool main body between a pressing position and a retracted position, and that includes the counter surface of the second mold tool configured and arranged to press and retract from the part of the edge portion of the trim component body respectively in the pressing position and the retracted position of the fourth mold tool in the closed position of the first and second mold tools; and
the fourth mold tool includes the counter edge that cooperates with the cutting edge of the third mold tool.

23. A molding apparatus for forming a trim component which includes a trim component body that is press-molded and an injection-molded rim that is injection-molded on an edge portion of the trim component body, wherein the molding apparatus comprises:
a first mold tool that has a first press-molding surface;
a second mold tool that has a second press-molding surface; and
a third mold tool that has a third injection-molding surface and a cutting edge;
wherein:
the first mold tool or the second mold tool has a counter edge;
the first and second mold tools are movable relative to one another in a first direction to bring the first and second mold tools into a closed position with the first and second press-molding surfaces juxtaposed facing one another with a press-molding cavity formed therebetween, adapted to press-mold the trim component body in the press-molding cavity;
the third mold tool is movable relative to the first mold tool and relative to the second mold tool in a second direction so that the cutting edge of the third mold tool cooperates with the counter edge of the first or second mold tool to cut off an excess material of the trim component body and form a cut edge terminating the edge portion of the trim component body, and so that the third mold tool is brought into a closed position relative to the first and/or second mold tool wherein the third injection-molding surface bounds at least a portion of an injection-molding cavity in which at least an exposed part of the edge portion of the trim component body is received and exposed;
at least one of the first mold tool, the second mold tool or the third mold tool has therein at least one injection channel that communicates into the injection-molding cavity;
the mold tools are configured, arranged and adapted to have an injection-moldable material injected through the at least one injection channel into the injection-molding cavity when the third mold tool is in the closed position thereof so as to form and mold the injection-molded rim onto the exposed part of the edge portion of the trim component body;
the second mold tool includes a second mold tool main body and a fourth mold tool that is movably attached to the second mold tool main body so as to be movable relative to the second mold tool main body; and
the fourth mold tool has the counter edge that cooperates with the cutting edge of the third mold tool.

\* \* \* \* \*